US012668974B2

(12) United States Patent
Hoffberg et al.

(10) Patent No.: US 12,668,974 B2
(45) Date of Patent: Jun. 30, 2026

(54) WHEELCHAIR RAMP

(71) Applicants: Richard Hoffberg, West Harrison, NY (US); Nicholas Peterson, Crystal Lake, NY (US); Matthew Swain, Buffalo, NY (US); Paula Zubiri, Tustin, CA (US); Berk Alper, Pittsburgh, PA (US); Ashwini Ganpule, Templeton, CA (US)

(72) Inventors: Richard Hoffberg, West Harrison, NY (US); Nicholas Peterson, Crystal Lake, NY (US); Matthew Swain, Buffalo, NY (US); Paula Zubiri, Tustin, CA (US); Berk Alper, Pittsburgh, PA (US); Ashwini Ganpule, Templeton, CA (US)

( * ) Notice: Subject to any disclaimer, the term of this patent is extended or adjusted under 35 U.S.C. 154(b) by 392 days.

(21) Appl. No.: 18/528,464

(22) Filed: Dec. 4, 2023

(65) Prior Publication Data

US 2024/0175268 A1 May 30, 2024

Related U.S. Application Data

(63) Continuation of application No. 16/868,501, filed on May 6, 2020, now Pat. No. 11,834,838.

(Continued)

(51) Int. Cl.
*E04F 11/00* (2006.01)
*A61G 5/06* (2006.01)
*A61G 5/10* (2006.01)

(52) U.S. Cl.
CPC ............ *E04F 11/002* (2013.01); *A61G 5/061* (2013.01); *A61G 5/10* (2013.01); *E04F 2011/005* (2013.01)

(58) Field of Classification Search
CPC .. E04F 11/002; E04F 2011/005; A61G 5/061; A61G 5/10
See application file for complete search history.

(56) References Cited

U.S. PATENT DOCUMENTS 4,039,096 A 8/1977 McAllister
4,084,713 A 4/1978 Rohrs (Continued)

OTHER PUBLICATIONS

U.S. Appl. No. 10/010,461, filed Jul. 3, 2018, Steven L. Kitchin.

(Continued)

*Primary Examiner* — Valentin Neacsu
*Assistant Examiner* — Michael R Stabley
(74) *Attorney, Agent, or Firm* — Hoffberg & Associates; Steven M. Hoffberg

(57) ABSTRACT

A ramp transportation system for a wheelchair enables transportation, deployment, and retrieval of a portable ramp by a single wheelchair occupant in the absence of external aid. The device comprises: a platform, configured to support the width of a wheelchair for crossing the platform, having a sufficient stiffness to support a wheelchair and occupant load; a lifting mechanism interface in the platform, disposed at least near each end of the ramp, configured to support cantilever lifting forces on the ramp; a lifting element, configured to engage the lifting mechanism interface and to apply a force to raise and lower the platform between a raised, stowed position and a lowered position, suitable for traversal; and a motor, configured to supply sufficient force on the lifting element to raise and lower the platform.

20 Claims, 18 Drawing Sheets

Related U.S. Application Data

(60) Provisional application No. 62/849,111, filed on May 16, 2019, provisional application No. 62/844,114, filed on May 6, 2019.

(56) References Cited

U.S. PATENT DOCUMENTS

| | | | | |
|---|---|---|---|---|
| 4,126,197 | A | 11/1978 | Kechely | |
| 4,219,104 | A | 8/1980 | MacLeod | |
| 4,339,224 | A | 7/1982 | Lamb | |
| 4,368,553 | A | 1/1983 | Perry | |
| 4,368,898 | A | 1/1983 | Lay | |
| 4,441,710 | A | 4/1984 | Lay | |
| 4,461,609 | A | 7/1984 | Zinno | |
| 4,559,659 | A | 12/1985 | Hunter, Jr. | |
| 4,580,652 | A | 4/1986 | Turner | |
| 4,630,709 | A | 12/1986 | Taylor | |
| 4,726,516 | A | 2/1988 | Cree | |
| 4,741,660 | A | 5/1988 | Kent | |
| 4,765,614 | A | 8/1988 | Shute | |
| 4,805,202 | A | 2/1989 | Deucher | |
| 4,807,317 | A | 2/1989 | Quinn | |
| 4,865,312 | A | 9/1989 | Katz | |
| 4,911,425 | A | 3/1990 | Kynast | |
| 4,912,796 | A | 4/1990 | Crump | |
| 4,966,516 | A | 10/1990 | Vartanian | |
| 5,040,936 | A | 8/1991 | Rhea | |
| 5,062,174 | A | 11/1991 | DaSalvo | |
| 5,085,555 | A | 2/1992 | Vartanian | |
| 5,106,152 | A | 4/1992 | Ward, Sr. | |
| 5,137,114 | A | 8/1992 | Yde | |
| 5,160,236 | A | 11/1992 | Redding | |
| 5,182,056 | A | 1/1993 | Spence | |
| 5,199,231 | A | 4/1993 | Dever | |
| 5,259,081 | A | 11/1993 | Henderson | |
| 5,325,558 | A | 7/1994 | Labreche | |
| 5,380,144 | A | 1/1995 | Smith | |
| 5,391,041 | A | 2/1995 | Stanbury | |
| 5,439,342 | A | 8/1995 | Hall | |
| 5,454,196 | A | 10/1995 | Gaines | |
| 5,476,429 | A | 12/1995 | Bigelow | |
| 5,505,663 | A | 4/1996 | Goulart | |
| 5,562,272 | A | 10/1996 | McAbee | |
| 5,636,399 | A | 6/1997 | Tremblay | |
| 5,652,976 | A | 8/1997 | Hopper | |
| 5,676,515 | A | 10/1997 | Haustein | |
| 5,704,876 | A | 1/1998 | Baatz | |
| 5,709,631 | A | 1/1998 | Kleinsasser | |
| 5,807,185 | A | 9/1998 | Raubuck | |
| 5,815,870 | A | 10/1998 | Deutch | |
| 5,832,555 | A | 11/1998 | Saucier | |
| 5,871,329 | A | 2/1999 | Tidrick | |
| 5,901,395 | A | 5/1999 | Vander Heiden | |
| 5,933,898 | A | 8/1999 | Estes | |
| 5,935,011 | A | 8/1999 | Morgan | |
| 5,994,649 | A | 11/1999 | Garfinkle | |
| 6,004,233 | A | 12/1999 | Raubuck | |
| 6,009,586 | A | 1/2000 | Hawkes | |
| 6,082,957 | A | 7/2000 | Kupka, Jr. | |
| 6,175,982 | B1 | 1/2001 | Cushwa | |
| 6,179,076 | B1 | 1/2001 | Fernie | |
| 6,179,545 | B1 | 1/2001 | Petersen, Jr. | |
| 6,227,790 | B1 | 5/2001 | Mollick | |
| 6,264,416 | B1 | 7/2001 | Eaton, Jr. | |
| 6,340,280 | B1 | 1/2002 | Mollick | |
| 6,390,537 | B1 | 5/2002 | DiGonis | |
| 6,430,769 | B1 | 8/2002 | Allen | |
| 6,463,613 | B1 | 10/2002 | Thompson | |
| 6,475,096 | B2 | 11/2002 | Nickolai | |
| 6,481,036 | B1 | 11/2002 | Duvall | |
| 6,526,614 | B2 | 3/2003 | Anderson | |
| 6,602,041 | B2 | 8/2003 | Lewis | |
| 6,616,396 | B2 | 9/2003 | Sternberg | |
| 6,698,998 | B2 | 3/2004 | Koretsky | |
| 6,701,563 | B2 * | 3/2004 | Schomaker | B65D 88/542 414/537 |
| 6,736,732 | B1 | 5/2004 | Devine | |
| D494,336 | S | 8/2004 | Smith | |
| D494,726 | S | 8/2004 | Smith | |
| 6,825,628 | B2 | 11/2004 | Heigl | |
| 6,843,635 | B2 | 1/2005 | Cohn | |
| 6,860,701 | B2 | 3/2005 | Kiser | |
| 6,928,959 | B1 | 8/2005 | Trauernicht | |
| 6,951,435 | B1 | 10/2005 | Fennessy, Sr. | |
| 6,957,716 | B1 | 10/2005 | Norris | |
| 6,986,519 | B2 | 1/2006 | Smith | |
| 6,997,815 | B2 | 2/2006 | Devine | |
| 7,001,132 | B2 | 2/2006 | Koretsky | |
| 7,033,127 | B2 | 4/2006 | Ungetheim | |
| 7,040,248 | B1 | 5/2006 | Whitfield | |
| 7,052,227 | B2 | 5/2006 | Navarro | |
| 7,240,388 | B2 | 7/2007 | Warford | |
| 7,243,938 | B2 | 7/2007 | Stamps | |
| 7,264,433 | B2 | 9/2007 | Navarro | |
| 7,309,836 | B2 | 12/2007 | Lubanski | |
| 7,326,024 | B2 | 2/2008 | Cohn | |
| 7,385,139 | B2 | 6/2008 | Lubanski | |
| 7,533,432 | B2 | 5/2009 | Morris | |
| 7,533,433 | B2 | 5/2009 | Morris | |
| 7,533,434 | B2 | 5/2009 | Morris | |
| 7,559,400 | B2 | 7/2009 | Smith | |
| 7,592,547 | B2 | 9/2009 | Lubanski | |
| D602,673 | S | 10/2009 | Allen | |
| 7,604,572 | B2 | 10/2009 | Stanford | |
| 7,607,186 | B1 | 10/2009 | Mitchell | |
| 7,681,272 | B2 | 3/2010 | Morris | |
| 7,758,475 | B2 | 7/2010 | Goldberg | |
| 7,798,761 | B2 | 9/2010 | Goodrich | |
| 7,802,337 | B2 | 9/2010 | Van Roosmalen | |
| 7,837,203 | B1 | 11/2010 | Schmidt | |
| 7,850,189 | B2 | 12/2010 | Barber | |
| 7,870,630 | B2 | 1/2011 | Johnson | |
| 7,870,631 | B2 | 1/2011 | Morris | |
| 7,913,341 | B1 | 3/2011 | Morris | |
| 7,913,342 | B1 | 3/2011 | Morris | |
| 7,913,343 | B1 | 3/2011 | Cohn | |
| 7,945,458 | B1 | 5/2011 | Jackson | |
| 7,946,083 | B2 | 5/2011 | Kirby | |
| 8,000,892 | B2 | 8/2011 | Banerjee | |
| 8,020,234 | B2 | 9/2011 | Johnson | |
| 8,032,963 | B2 | 10/2011 | Morris | |
| 8,057,152 | B1 | 11/2011 | White | |
| 8,087,496 | B1 | 1/2012 | Taylor | |
| 8,087,559 | B2 | 1/2012 | Medina | |
| 8,122,552 | B2 | 2/2012 | Morris | |
| 8,122,553 | B1 | 2/2012 | Johnson | |
| 8,132,281 | B1 | 3/2012 | Johnson | |
| 8,166,594 | B1 | 5/2012 | Morris | |
| 8,181,300 | B1 | 5/2012 | Johnson | |
| 8,215,020 | B1 | 7/2012 | Johnson | |
| 8,230,539 | B2 | 7/2012 | Morris | |
| 8,234,737 | B2 | 8/2012 | Morris | |
| 8,240,053 | B1 | 8/2012 | Johnson | |
| 8,250,693 | B1 | 8/2012 | Johnson | |
| 8,327,485 | B1 | 12/2012 | Morris | |
| 8,359,691 | B2 | 1/2013 | Morris | |
| 8,375,496 | B1 | 2/2013 | Johnson | |
| 8,397,329 | B2 * | 3/2013 | Just | A61G 3/067 14/73.1 |
| 8,398,356 | B2 | 3/2013 | Sandoz | |
| 8,402,660 | B1 | 3/2013 | Johnson | |
| 8,434,181 | B1 | 5/2013 | Johnson | |
| 8,438,683 | B1 | 5/2013 | Morris | |
| 8,505,141 | B1 | 8/2013 | Morris | |
| 8,533,884 | B1 | 9/2013 | Johnson | |
| 8,534,979 | B2 | 9/2013 | Hansen | |
| 8,578,536 | B1 | 11/2013 | Morris | |
| 8,590,159 | B1 | 11/2013 | Johnson | |
| 8,594,935 | B2 | 11/2013 | Cioffi | |
| 8,621,696 | B1 | 1/2014 | Morris | |
| 8,635,729 | B1 | 1/2014 | Johnson | |
| 8,640,827 | B2 | 2/2014 | Breithaupt, Jr. | |
| 8,733,792 | B2 | 5/2014 | Wallace | |
| 8,739,341 | B1 | 6/2014 | Morris | |
| 8,745,800 | B1 | 6/2014 | Morris | |

(56) References Cited

U.S. PATENT DOCUMENTS 8,763,186 B2 7/2014 Mosey
8,769,823 B1 7/2014 Johnson
8,813,289 B1 8/2014 Clark
8,832,001 B2 9/2014 Handley
8,844,083 B2 9/2014 McGivern
8,869,333 B2 10/2014 Johnson
8,886,462 B1 11/2014 Cioffi
8,919,049 B2 12/2014 Meserini
8,938,837 B1 1/2015 Johnson
8,959,693 B2 2/2015 Pohlman
8,979,162 B1 3/2015 Alasfour
8,989,348 B2 3/2015 Cox
8,994,776 B2 3/2015 Sutherland
9,016,976 B2 4/2015 Dixon
D731,601 S 6/2015 Bradley
9,050,229 B1 6/2015 Morris
9,101,519 B2 8/2015 Smith
9,109,908 B2 8/2015 Bach
9,114,049 B2 8/2015 Callahan
9,121,809 B2 9/2015 Cox
9,271,883 B2 3/2016 Johnson
9,289,337 B2 3/2016 Fritsche
9,440,356 B2 9/2016 Sutherland
9,498,696 B1 11/2016 Razon
9,513,385 B2 12/2016 Cox
9,574,885 B2 2/2017 Bach
9,632,671 B2 4/2017 Albright
9,659,503 B2 5/2017 Gordon
9,689,811 B2 6/2017 Cox
9,734,725 B2 8/2017 Gordon
9,789,922 B2 10/2017 Dosenbach
9,820,899 B1 11/2017 Morris
9,863,776 B2 1/2018 Gordon
9,896,871 B2 2/2018 Ungetheim
11,834,838 B2 * 12/2023 Hoffberg ............... E04F 11/002
2001/0048870 A1 12/2001 Lewis
2002/0072425 A1 6/2002 Nickolai
2002/0081184 A1 6/2002 Sternberg
2002/0105170 A1 8/2002 Smith
2002/0110444 A1 8/2002 Navarro
2002/0144364 A1 10/2002 Anderson
2002/0159871 A1 10/2002 Ungetheim
2002/0197141 A1 12/2002 Cohn
2003/0007851 A1 1/2003 Heigl
2003/0116927 A1 * 6/2003 Quigg .................... A61G 5/066
280/5.22
2003/0210976 A1 11/2003 Koretsky
2003/0215316 A1 11/2003 Burney
2004/0013507 A1 1/2004 Kiser
2004/0034950 A1 2/2004 Massaro
2004/0096304 A1 5/2004 Lewis
2004/0147216 A1 7/2004 Temple
2004/0172775 A1 9/2004 Koretsky
2004/0228713 A1 11/2004 Cohn
2004/0249855 A1 12/2004 Detweiler
2005/0015899 A1 1/2005 Jeruss
2005/0074318 A1 4/2005 Howard
2005/0101394 A1 5/2005 Devine
2005/0123380 A1 6/2005 Massaro
2005/0173888 A1 8/2005 Stamps
2005/0215371 A1 9/2005 Navarro
2005/0263987 A1 12/2005 Smith
2006/0027619 A1 2/2006 Walther
2006/0088396 A1 4/2006 Thom
2006/0104773 A1 5/2006 Koretsky
2006/0104775 A1 5/2006 Kasten
2006/0146719 A1 7/2006 Sobek
2006/0156492 A1 7/2006 Warford
2006/0245883 A1 11/2006 Fontaine
2007/0059140 A1 3/2007 Kiser
2007/0086879 A1 4/2007 Goodrich
2007/0095560 A1 5/2007 Lubanski
2007/0095561 A1 5/2007 Lubanski
2007/0131883 A1 6/2007 Goodrich
2007/0173392 A1 7/2007 Stanford
2007/0241153 A1 10/2007 Medina
2008/0093102 A1 4/2008 Lubanski
2008/0184500 A1 8/2008 Bettcher
2008/0184502 A1 8/2008 Roberts
2008/0187425 A1 8/2008 Morris
2008/0271266 A1 11/2008 Johnson
2008/0271267 A1 11/2008 Morris
2008/0271268 A1 11/2008 Johnson
2008/0271269 A1 11/2008 Morris
2008/0273956 A1 11/2008 Morris
2008/0312819 A1 12/2008 Banerjee
2009/0035111 A1 2/2009 Morris
2009/0035112 A1 2/2009 Morris
2009/0035113 A1 2/2009 Morris
2009/0106918 A1 4/2009 Van Roosmalen
2009/0108561 A1 4/2009 Barber
2009/0156371 A1 6/2009 Goldberg
2009/0250895 A1 10/2009 Smith
2009/0271077 A1 10/2009 Goodrich
2009/0271934 A1 11/2009 Morris
2009/0300860 A1 12/2009 Campbell
2009/0308672 A1 12/2009 Soldatos
2010/0011520 A1 1/2010 Wollborg
2010/0066111 A1 3/2010 Fritsche
2010/0241350 A1 9/2010 Cioffi
2010/0307096 A1 12/2010 Kirby
2011/0008141 A1 1/2011 Goodrich
2011/0023246 A1 2/2011 Morris
2011/0027054 A1 2/2011 Hansen
2011/0035104 A1 2/2011 Smith
2011/0041418 A1 2/2011 Meserini
2011/0049828 A1 3/2011 Schmidt
2011/0072598 A1 3/2011 Morris
2011/0073824 A1 3/2011 Lappin
2011/0088174 A1 4/2011 Morris
2011/0088175 A1 4/2011 Morris
2011/0088176 A1 4/2011 Cohn
2011/0088177 A1 4/2011 Johnson
2011/0088179 A1 4/2011 Morris
2011/0127402 A1 6/2011 Callahan
2011/0147094 A1 6/2011 Gerster
2011/0159465 A1 6/2011 Gutridge
2011/0187080 A1 8/2011 Wallace
2011/0238291 A1 9/2011 Bach
2011/0270654 A1 11/2011 Banerjee
2011/0297483 A1 12/2011 Breithaupt, Jr.
2012/0023669 A1 2/2012 Graller
2012/0087716 A1 4/2012 Morris
2012/0111261 A1 5/2012 Schmitt
2012/0238921 A1 9/2012 Kuehne
2012/0259544 A1 10/2012 Watson
2012/0278985 A1 11/2012 Cornille
2012/0294699 A1 11/2012 Sandoz
2013/0055511 A1 3/2013 McGivern
2013/0121761 A1 5/2013 Dixon
2013/0136231 A1 5/2013 Cox
2013/0174359 A1 7/2013 Morris
2013/0198978 A1 8/2013 Pohlman
2013/0202087 A1 8/2013 Cox
2013/0205257 A1 8/2013 Albright
2013/0232685 A1 9/2013 Cornille
2013/0330157 A1 12/2013 Asztalos
2014/0009561 A1 1/2014 Sutherland
2014/0035921 A1 2/2014 Yeh
2014/0039986 A1 2/2014 Handley
2014/0040166 A1 2/2014 Handley
2014/0123410 A1 5/2014 Mosey
2014/0123411 A1 5/2014 Mosey
2014/0199144 A9 7/2014 Asztalos
2014/0219756 A1 8/2014 Smith
2014/0245548 A1 9/2014 Johnson
2014/0248109 A1 9/2014 Johnson
2014/0324341 A1 10/2014 Cioffi
2015/0032490 A1 1/2015 Handley
2015/0127256 A1 5/2015 Cioffi
2015/0177391 A1 6/2015 Cox
2015/0190927 A1 7/2015 Sutherland
2015/0330787 A1 11/2015 Cioffi
2015/0345956 A1 12/2015 Bach

(56) References Cited

U.S. PATENT DOCUMENTS

| | | | |
|---|---|---|---|
| 2015/0346118 | A1 | 12/2015 | Cox |
| 2016/0019473 | A1 | 1/2016 | Yadidi |
| 2016/0095767 | A1 | 4/2016 | Smith |
| 2016/0104081 | A1 | 4/2016 | Ho |
| 2016/0164976 | A1 | 6/2016 | Hassan |
| 2016/0176459 | A1 | 6/2016 | Dosenbach |
| 2016/0220431 | A1 | 8/2016 | Asztalos |
| 2016/0221607 | A1 | 8/2016 | Schmidt |
| 2016/0242975 | A1 | 8/2016 | Kitchin |
| 2017/0015003 | A1 | 1/2017 | Sutherland |
| 2017/0016735 | A1 | 1/2017 | Gordon |
| 2017/0018193 | A1 | 1/2017 | Gordon |
| 2017/0038484 | A1 | 2/2017 | Cox |
| 2017/0111453 | A1 | 4/2017 | Hassan |
| 2017/0176194 | A1 | 6/2017 | Gordon |
| 2017/0234048 | A1 | 8/2017 | Ungetheim |
| 2017/0240214 | A1 | 8/2017 | Pelletier |
| 2017/0256181 | A1 | 9/2017 | Chen |
| 2017/0325776 | A1 | 11/2017 | Cox |
| 2017/0347885 | A1 | 12/2017 | Tan |
| 2017/0350130 | A1 | 12/2017 | Meisel |
| 2018/0086601 | A1 | 3/2018 | Okonski |
| 2018/0123821 | A1 | 5/2018 | Alberth, Jr. |
| 2018/0124178 | A1 | 5/2018 | Alberth, Jr. |
| 2018/0128031 | A1 | 5/2018 | Ungetheim |
| 2018/0139285 | A1 | 5/2018 | Hassan |
| 2018/0174111 | A1 | 6/2018 | Breedvelt-Schouten |
| 2018/0174112 | A1 | 6/2018 | Breedvelt-Schouten |
| 2018/0182181 | A1 | 6/2018 | Dolan |
| 2018/0221236 | A1 | 8/2018 | Girardini |
| 2018/0300773 | A1 | 10/2018 | Oechsner |
| 2018/0330586 | A1 | 11/2018 | Alberth, Jr. |
| 2018/0374003 | A1 | 12/2018 | Hou |
| 2019/0000699 | A1 | 1/2019 | Kitchin |
| 2019/0061619 | A1 | 2/2019 | Reymann |
| 2019/0070967 | A1 | 3/2019 | Ishigaki |
| 2019/0099315 | A1 | 4/2019 | Kuehne |
| 2019/0106042 | A1 | 4/2019 | Hill |
| 2019/0116228 | A1 | 4/2019 | Hassan |

OTHER PUBLICATIONS

U.S. Appl. No. 10/020,956, filed Jul. 10, 2018, William P. Alberth, Jr.

U.S. Appl. No. 10/029,370, filed Jul. 24, 2018, Stephen B. Sutherland.

U.S. Appl. No. 10/059,383, filed Aug. 28, 2018, John-Paul Pelletier.

U.S. Appl. No. 10/062,302, filed Aug. 28, 2018, Tiffany Chen.

U.S. Appl. No. 10/157,509, filed Dec. 18, 2018, Bryan R. Dolan.

U.S. Appl. No. 10/187,471, filed Jan. 22, 2019, William P. Alberth, Jr.

U.S. Appl. No. 10/231,895, filed Mar. 19, 2019, Serena Girardini.

U.S. Appl. No. 10/246,015, filed Apr. 2, 2019, Steffen Reymann.

U.S. Appl. No. 10/255,794, filed Apr. 9, 2019, Vic Merjanian.

U.S. Appl. No. 11/834,838, filed Dec. 5, 2023, Richard Hoffberg.

* cited by examiner

1100

1510

1520

1530

1540

1550

1560

1570

1580

WHEELCHAIR RAMP

CROSS REFERENCE TO RELATED APPLICATIONS

The present application is a Continuation of U.S. patent application Ser. No. 16/868,501, filed May 6, 2020, now U.S. Pat. No. 11,834,838, issued Nov. 5, 2023, which claims benefit of priority under 35 U.S.C. § 119(e) from U.S. Provisional Patent Application No. 62/849,111, filed May 16, 2019, and from U.S. Provisional Patent Application No. 62/844,114, filed May 6, 2019, the entirety of which are expressly incorporated herein by reference.

FIELD OF THE INVENTION

The present invention relates to the field of self-transported wheelchair ramps.

BACKGROUND OF THE INVENTION

There are many public locations which are inaccessible to persons in wheelchairs. Usually this inaccessibility is caused by uneven surfaces such as steps, curbs, or gutters which cannot be readily traversed by a wheelchair when no ramp or curb cut are nearby to provide alternative access. The standard manual wheelchair is ineffective in overcoming these uneven surfaces without outside assistance or practice with special technique—namely "popping a wheelie." This "wheelie" technique, however, is not reliably nor safely performed by persons in wheelchairs lacking the necessary range of motion, strength, or balance, or even those persons with the physical capability to do so. What is required is a device for persons in wheelchairs which facilitates a safe transition across uneven surfaces without outside assistance.

Each reference cited herein is expressly incorporated herein by reference in its entirety. See U.S. Patents and Pub. Appln. Nos.: U.S. Pat. Nos. 4,039,096; 4,084,713; 4,126,197; 4,219,104; 4,339,224; 4,368,553; 4,368,898; 4,441,710; 4,461,609; 4,559,659; 4,580,652; 4,630,709; 4,726,516; 4,741,660; 4,765,614; 4,805,202; 4,807,317; 4,865,312; 4,911,425; 4,912,796; 4,966,516; 5,040,936; 5,062,174; 5,085,555; 5,106,152; 5,137,114; 5,160,236; 5,182,056; 5,199,231; 5,259,081; 5,325,558; 5,380,144; 5,391,041; 5,439,342; 5,454,196; 5,476,429; 5,505,663; 5,562,272; 5,636,399; 5,652,976; 5,676,515; 5,704,876; 5,709,631; 5,807,185; 5,815,870; 5,832,555; 5,871,329; 5,901,395; 5,933,898; 5,935,011; 5,994,649; 6,004,233; 6,009,586; 6,082,957; 6,175,982; 6,179,076; 6,179,545; 6,227,790; 6,264,416; 6,340,280; 6,390,537; 6,430,769; 6,463,613; 6,475,096; 6,481,036; 6,526,614; 6,602,041; 6,616,396; 6,698,998; 6,736,732; 6,825,628; 6,843,635; 6,860,701; 6,928,959; 6,951,435; 6,957,716; 6,986,519; 6,997,815; 7,001,132; 7,033,127; 7,040,248; 7,052,227; 7,240,388; 7,243,938; 7,264,433; 7,309,836; 7,326,024; 7,385,139; 7,533,432; 7,533,433; 7,533,434; 7,559,400; 7,592,547; 7,604,572; 7,607,186; 7,681,272; 7,758,475; 7,798,761; 7,802,337; 7,837,203; 7,850,189; 7,870,630; 7,870,631; 7,913,341; 7,913,342; 7,913,343; 7,945,458; 7,946,083; 8,000,892; 8,020,234; 8,032,963; 8,057,152; 8,087,496; 8,087,559; 8,122,552; 8,122,553; 8,132,281; 8,166,594; 8,181,300; 8,215,020; 8,230,539; 8,234,737; 8,240,053; 8,250,693; 8,327,485; 8,359,691; 8,375,496; 8,398,356; 8,402,660; 8,434,181; 8,438,683; 8,505,141; 8,533,884; 8,534,979; 8,578,536; 8,590,159; 8,594,935; 8,621,696; 8,635,729; 8,640,827; 8,733,792; 8,739,341; 8,745,800; 8,763,186; 8,769,823; 8,813,289; 8,832,001; 8,844, 083; 8,869,333; 8,886,462; 8,919,049; 8,938,837; 8,959,693; 8,979,162; 8,989,348; 8,994,776; 9,016,976; 9,050,229; 9,101,519; 9,109,908; 9,114,049; 9,121,809; 9,271,883; 9,289,337; 9,440,356; 9,498,696; 9,513,385; 9,574,885; 9,632,671; 9,659,503; 9,689,811; 9,734,725; 9,789,922; 9,820,899; 9,863,776; 9,896,871; D494336; D494726; D602673; D731601; 10,010,461; 10,020,956; 10,029,370; 10,059,383; 10,062,302; 10,157,509; 10,187,471; 10,231,895; 10,246,015; 10,255,794; 20010048870; 20020072425; 20020081184; 20020105170; 20020110444; 20020144364; 20020159871; 20020197141; 20030007851; 20030210976; 20030215316; 20040013507; 20040034950; 20040096304; 20040147216; 20040172775; 20040228713; 20040249855; 20050015899; 20050074318; 20050101394; 20050123380; 20050173888; 20050215371; 20050263987; 20060027619; 20060088396; 20060104773; 20060104775; 20060146719; 20060156492; 20060245883; 20070059140; 20070086879; 20070095560; 20070095561; 20070131883; 20070173392; 20070241153; 20080093102; 20080184500; 20080184502; 20080187425; 20080271266; 20080271267; 20080271268; 20080271269; 20080273956; 20080312819; 20090035111; 20090035112; 20090035113; 20090106918; 20090108561; 20090156371; 20090250895; 20090271077; 20090271934; 20090300860; 20090308672; 20100011520; 20100066111; 20100241350; 20100307096; 20110008141; 20110023246; 20110027054; 20110035104; 20110041418; 20110049828; 20110072598; 20110073824; 20110088174; 20110088175; 20110088176; 20110088177; 20110088179; 20110127402; 20110147094; 20110159465; 20110187080; 20110238291; 20110270654; 20110297483; 20120023669; 20120087716; 20120111261; 20120238921; 20120259544; 20120278985; 20120294699; 20130055511; 20130121761; 20130136231; 20130174359; 20130198978; 20130202087; 20130205257; 20130232685; 20130330157; 20140009561; 20140035921; 20140039986; 20140040166; 20140123410; 20140123411; 20140199144; 20140219756; 20140245548; 20140248109; 20140324341; 20150032490; 20150127256; 20150177391; 20150190927; 20150330787; 20150345956; 20150346118; 20160019473; 20160095767; 20160104081; 20160164976; 20160176459; 20160220431; 20160221607; 20160242975; 20170015003; 20170016735; 20170018193; 20170038484; 20170111453; 20170176194; 20170234048; 20170240214; 20170256181; 20170325776; 20170347885; 20170350130; 20180086601; 20180123821; 20180124178; 20180128031; 20180139285; 20180174111; 20180174112; 20180182181; 20180221236; 20180300773; 20180330586; 20180374003; 20190000699; 20190061619; 20190070967; 20190099315; 20190106042; and 20190116228.

SUMMARY OF THE INVENTION

The present technology provides a self-portable wheelchair ramp that is supported behind the wheelchair in a near-vertical position, and is lowered across an uneven surface by a motor-driven mechanism. Once in place, the ramp is free from the wheelchair, and the wheelchair is able to cross the surface. Once across, the ramp is then loaded on the back of the wheelchair using the same motor and mechanism. As result of the crossing, the ramp becomes inverted with respect to the user, and thus is symmetric. In general, the wheelchair is backed over the ramp after deployment, and then the chair turned around, with a visual guidance system, e.g., a camera and display, provided to permit efficient maneuvering of the chair to align with the ramp so it can be stowed for subsequent use.

A self-engaging "H-bar" links the wheelchair ramp to the lifting mechanism, which then releases the ramp to its deployed (near horizontal) position.

The motor acts through a cable and pulley system, to absorb shocks, and increase effective torque.

A mechanical safety latch secures the ramp in its near-vertical position to prevent displacement of the ramp while not in use or in the event of system failure.

A mechanical stop protects the user and limits the range of motion of the ramp in stowage.

It is therefore an object to provide a ramp transportation system for a wheelchair, comprising: a platform assembly, configured to support the width of a wheelchair for crossing the platform assembly, having a sufficient stiffness to support a wheelchair and occupant load; a lifting mechanism interface in the platform assembly, disposed at least near each end of the ramp, configured to support cantilever lifting forces on the ramp; a lifting element, configured to engage the lifting mechanism interface and to apply a force to raise and lower the platform assembly between a raised, stowed position and a lowered position, suitable for traversal; a motor-driven mechanism, configured to supply sufficient force on the lifting element to raise and lower the platform assembly; a control, configured to drive the motor; A motor may be disposed below a seat of the wheelchair, and the platform assembly in the stowed position is behind the wheelchair. The platform assembly may be collapsible to accommodate wheelchair folding. The motor alone may directly drive the lifting element. The motor may drive a mechanism comprising a cable and a pulley. The motor may drive a mechanism comprising a geartrain. A mechanical or electromechanical safety may be provided to secure the platform assembly in the stowed position. A mechanical stop may be provided to prevent collision of the ramp with the rear of the wheelchair.

It is also an object to provide a wheelchair ramp system, comprising: a ramp having a platform, configured to support wheels of a wheelchair for traversing the platform, having a sufficient stiffness to support a wheelchair and occupant load, and a lifting mechanism interface in the platform disposed at least near each end of the platform, configured to support cantilever lifting forces on the platform; a lifting element, configured to engage the lifting mechanism interface and to apply a force to raise and lower the platform between a raised, stowed position and a lowered position, deployed position, suitable for traversal of the wheelchair across the platform; a motor, configured to supply sufficient force on the lifting element to raise and lower the platform; and a control, configured to drive the motor;

A motor may be disposed below a seat of the wheelchair. The platform or ramp in the stowed position may be disposed behind the wheelchair. The platform may be collapsible to accommodate wheelchair folding.

The motor alone may directly drive the lifting element. The motor may drive a mechanism comprising a cable and a pulley. The motor may drive a mechanism comprising a geartrain.

A mechanical element or electromechanical element may be provided to secure the platform in the stowed position. The mechanical element or electromechanical element may be manually or automatically operated to secure the platform in the stowed position.

A mechanical stop may be provided to prevent collision of the ramp with the rear of the wheelchair at the end of movement into the stowed position.

It is also an object to provide a method of permitting a wheelchair to traverse a sharp change in elevation, comprising: providing a ramp, configured to support wheels of the wheelchair for traversing the ramp, having a sufficient stiffness to support a wheelchair and occupant load, in a near vertical orientation at a rear of the wheelchair, the ramp having a lifting mechanism interface disposed at least near each end of the ramp, configured to support cantilever lifting forces on the ramp to raise and lower the ramp to and from a horizontal orientation, and to engage and disengage with a lifting mechanism; lowering the ramp at the rear of the wheelchair to a near-horizontal orientation across the sharp change in elevation, by actuating the lifting mechanism to lower the ramp; and disengaging the lifting mechanism from the lifting mechanism interface, to thereby permit the wheelchair to freely traverse the ramp.

After the wheelchair traverses the ramp, the lifting mechanism may be reengaged with the lifting mechanism interface, and the ramp raised at the rear of the wheelchair from the near-horizontal orientation to the near vertical orientation.

The ramp may be latched at the rear of the wheelchair in the near vertical orientation.

The lowering and/or raising may be controlled by a microprocessor. The microprocessor may control additional features of the wheelchair, such as battery charging, obstacle avoidance, communications (cellular [WAN], WiFi [LAN], Bluetooth [PAN]), entertainment, guidance, navigation, autonomous features, and the like.

The lifting mechanism may be driven by a motor, configured to supply sufficient force on the lifting element to raise and lower the ramp. Alternately, a pneumatic or hydraulic system may be provided. For example, a pneumatic system may operate a cylinder from a compressed gas canister, which may be a sufficient reservoir for extended use, or recharged with a compressor. In this case, the compressor may be relatively small, since the recharge of the reservoir can occur over a much longer period that the traversal.

The motor, or other actuator system, may be controlled by a microprocessor. The motor may directly drive the ramp, drive the ramp through a cable and a pulley, drive the ramp through a geartrain, or other mechanism.

The method may comprise maintaining the ramp in the near vertical orientation with a latch, and unlatching the ramp before lowering the ramp. The latch may be manual or automated, and an automated latch may be driven by a microcontroller, and automatically unlatched before lowering the ramp. The ramp may be distanced from the rear of the wheelchair with a mechanical stop, which may have shock absorption capability to avoid dynamic disturbance of the wheelchair as the ramp is raised to the stowed position.

DETAILED DESCRIPTION OF THE PREFERRED EMBODIMENT

Full System Assembly Overview

The device is capable of deploying and retrieving a portable ramp, within a full user-cycle averaging no more than 1 minute 30 seconds (90 seconds). Furthermore, the device preferably is able to mount onto any standard wheelchair frame, and not interfere with normal use of the chair, including minimizing the weight of the addition.

Figure 1:
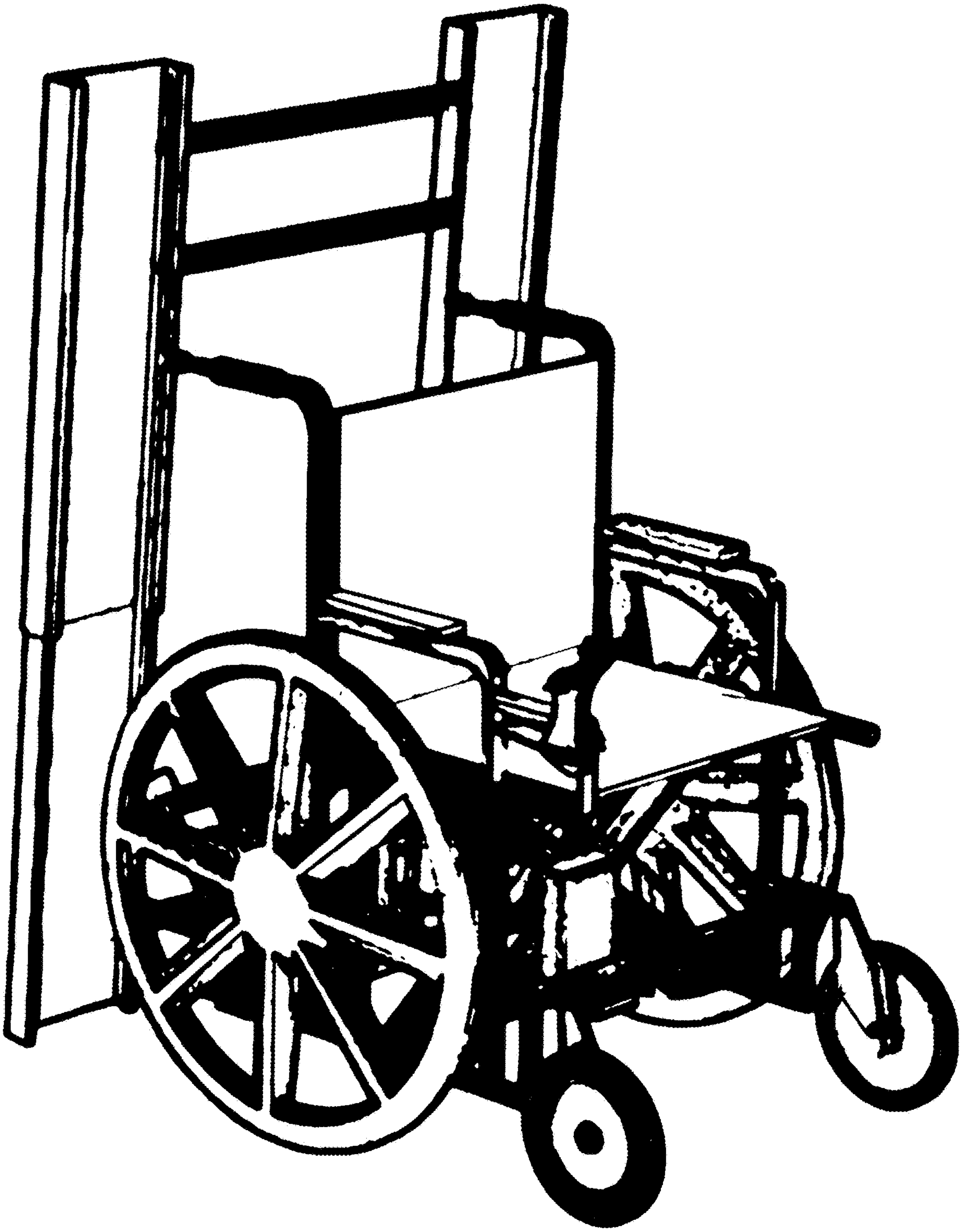
FIG. 1 shows a view of a full assembly with the ramp in stowed position.
Figure 2:
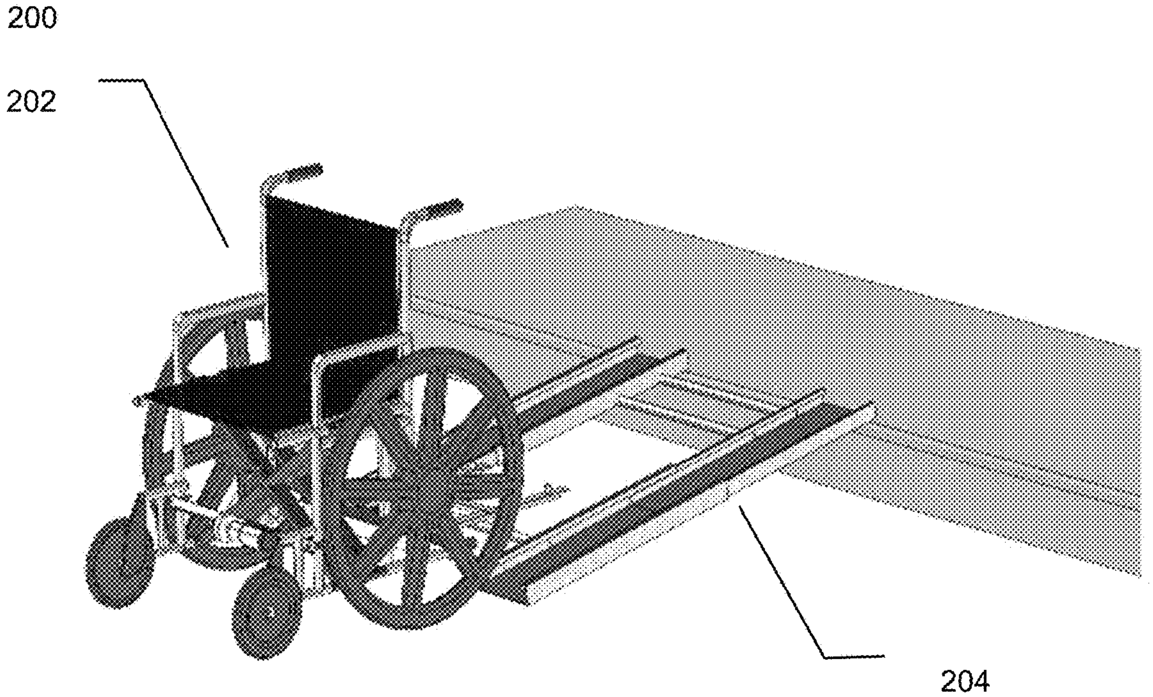
FIG. 2 shows the ramp lowered and deployed across a 7-inch curb.
Figure 3:
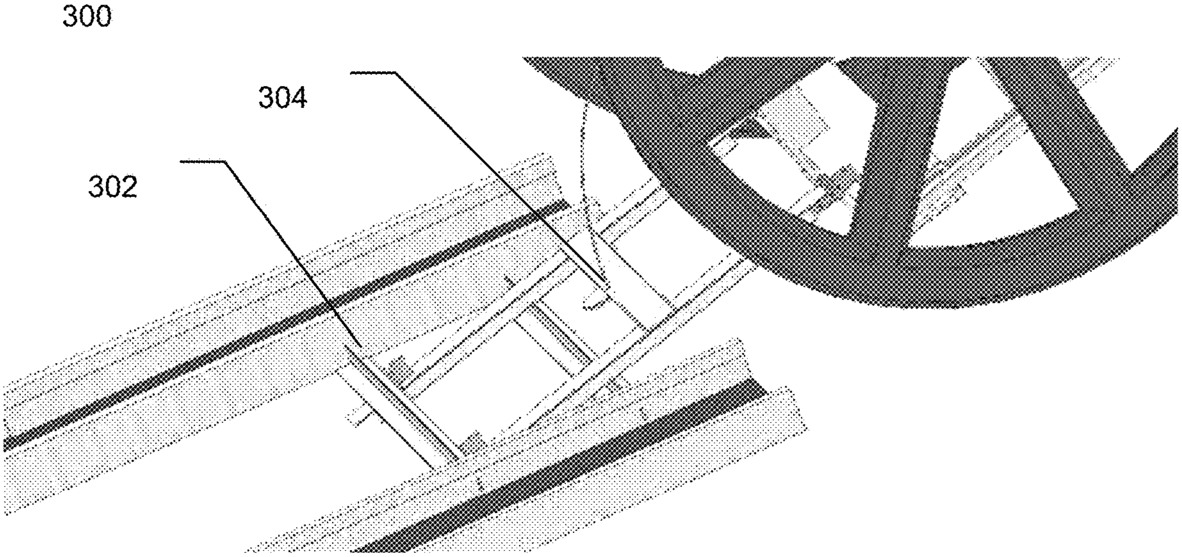
FIGS. 3-7 show views of the RAM which interfaces with the ramp.

FIG. 1 shows a model of the full device assembly mounted on a model wheelchair. FIG. 2 shows the ramp 202 lowered and deployed atop model 7-inch curb 204. The device consists of three major subsystems and mounting components to secure these systems to the wheelchair. These three major systems are:

- the Ramp-Arm Mechanism ("RAM") 304;
- the Ramp System 302; and
- the Electromechanical System consisting of the motor/pulley, battery, microcontroller, and various other electrical components 1000.

The device functionally lowers and raises a hinged, rack-like, "H-bar" 304 arm on the rear of the wheelchair, which is referred to as the Ramp-Arm Mechanism ("RAM"). This lowering/raising function is accomplished by motor-torque supplied from the Electromechanical System: torque is transferred by a steel cable 402 channeled from the motor/pulley at the front of the wheelchair to the RAM at the rear of the chair. In the stowed state, towards the very rear of the wheelchair and resting on the RAM is the Ramp System. This ramp-set consists of two pre-manufactured ramp-rails 404, each 7.5 inches in width and fixed to a length of 4-feet for normal usage. Of course, the length may vary, and the width should correspond to the width of the wheelchair itself.

Components/Subsystems

T-Beams 502 and L-Beams 602 were used for many of the structural components of the system, in order to increase structural strength against bending stress.

A reducing pulley system is used in order to reduce the amount of torque required from the motor, and thus double the maximum lift force the motor could provide to the RAM. While this may be avoided by use of a powerful motor alone, this reduction increases the device factor of safety to account for unforeseen sources of friction, such as dirt or debris in the hinged element, reduces peak power and current, and weight of the motor and battery.

A free-rotating hinge with more than 180 degrees of rotation 702, is used to allow the RAM H-Bar to freely pivot. This range of motion may also be accomplished by use of other connectors, such as a set of ball and socket joints, however simple hinges proved to be sufficient in the embodiment.

Springs and spring-loaded rods were used in locations to induce a tendency in components (i.e., the Ramp and RAM) to move in the deployment direction when released (not shown).

Shaft Collars 1200 provide a reliable point of connection for the system components onto the wheelchair's frame, without adding too much weight or damaging the wheelchair.

The user interfaces with three switches 1802:

Rocker—to turn the system on and off.

Toggle—to change the direction of the RAM (up/down).

Push—to activate the RAM to raise or lower the ramp.

A microcontroller 1804 (e.g., an Arduino, powered by a 9V battery) reads these switch inputs and then sends a pulse width modulated ("PWM") signal to the motor controller. The motor controller then supplies power from the main battery 1806 to the motor 1808 to drive it in the desired direction. The motor, as a result, then provides sufficient torque 1810 to raise and lower 1812 the ramp 1814. The microcontroller and associated circuitry may be provided with various sensors, such as current, voltage, motor speed, motor temperature, battery state, etc., which may provide ancillary basis for control over the system. The motor and motor controller are both powered by a rechargeable 20V battery.

When ascending, the ramp will automatically stop when vertical. A limit switch 1604 is triggered in order to stop the system for safety reasons. Of course, other ramp-state sensors may be provided and used for control.

Ramp-Arm Mechanism (RAM)

The RAM consists of one pair of 17-inch aluminum T-beams 502 attached and hinged to a crossbeam 604 spanning the width between two cylindrical members at the rear of the wheelchair. The T-beams are fixed in width by another ~11-inch aluminum T-beam 606 member located about 6.5 inches along their length from the hinges. Steel cable 402 is channeled through this horizontal T-beam member 802 and ends at a disk-shaped stopper behind the beam 804. A ~6.5-inch tall vertical aluminum post 806 and mounted pulley 808 (shown in FIG. 8) also channel this steel cable 402 and provides mechanical advantage in applying torque to the ramp. Upright tabs 608 are affixed at the end of the RAM and serve to indicate when the user has touched the second horizontal beam of the ramp during retrieval.

As the RAM is hinged, it may rotate to be nearly upright when in rest 1100. Due to the set length of the steel cable, the RAM may also rotate about 40° below the wheelchair's horizontal 1560. This range of motion is utilized in lowering/deploying the ramp, and again during lifting/retrieval of the ramp.

FIGS. 3-7 show various views of the RAM as it is intended to interface with the Ramp System during retrieval—when the user has rolled their wheelchair up and onto a raised curb, the RAM has been lowered, and the user has reversed until the RAM's far tabs have touched the second horizontal beam of the ramp. In this process, the RAM slides over the first horizontal beam of the ramp and slides just under the second horizontal beam. The motor then drives the steel cable to pull the RAM/Ramp combination toward the rear-face of the chair to its intended rest position.

Ramp System

The Ramp System consists of two pre-manufactured aluminum telescoping ramp-rails 404, each 7.5 inches in width and fixed to a length of 4-feet during use. For storage purposes, the user may still telescope the ramp-set down to just under 3-feet by depressing the yellow buttons on both sides 704. The Ramp system is fixed to a width of 31 inches by four horizontal beams, accommodating the distance between the wheelchair rear-wheels as well as the distance between the wheelchair casters. These horizontal beams slide into slots machined into the side of the ramp and are secured by screw. The layout of these four beams ensures a symmetrical user cycle in which the RAM can interface at the top or bottom of a curb.

The ramp itself is rated for 600-lbs load, and includes a high traction grit surface as well as sidewalls to prevent the user from falling off the sides.

FIG. 2 shows the ramp deployed onto a 7-inch high curb.

Figure 4:
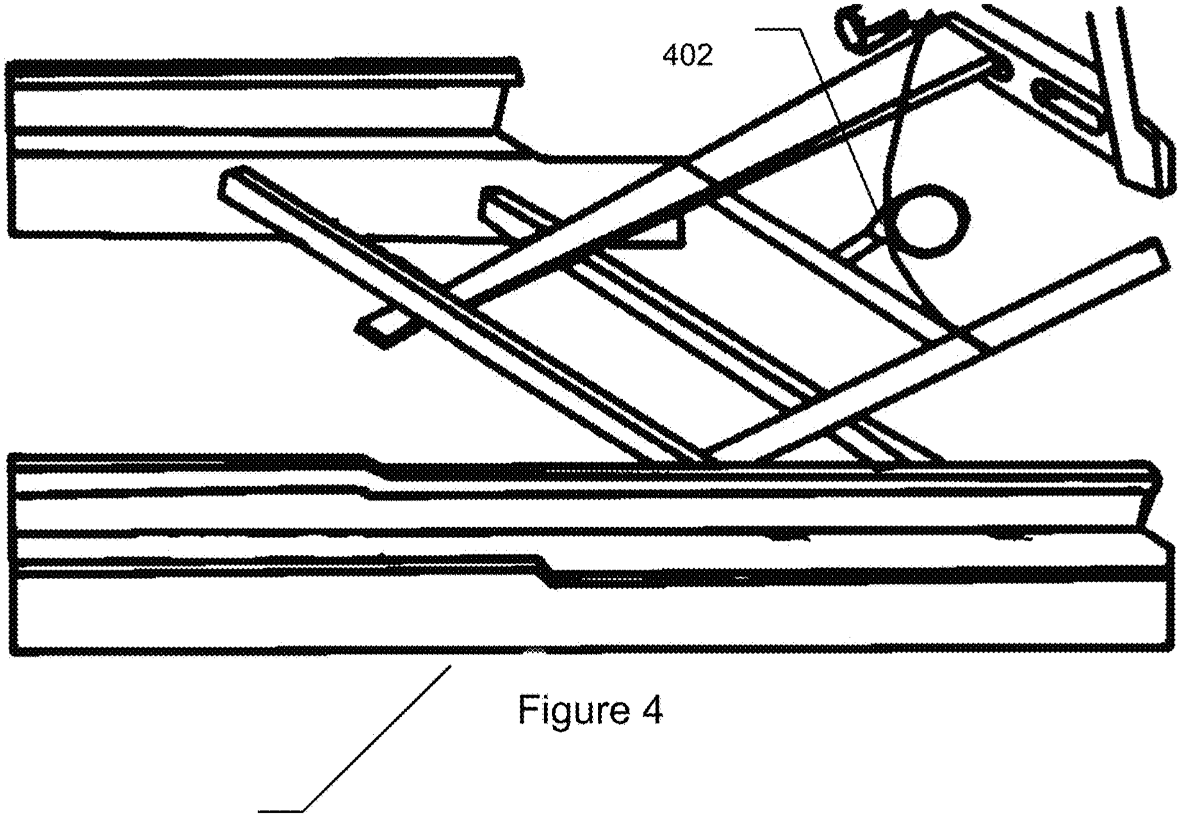
Figure 5:
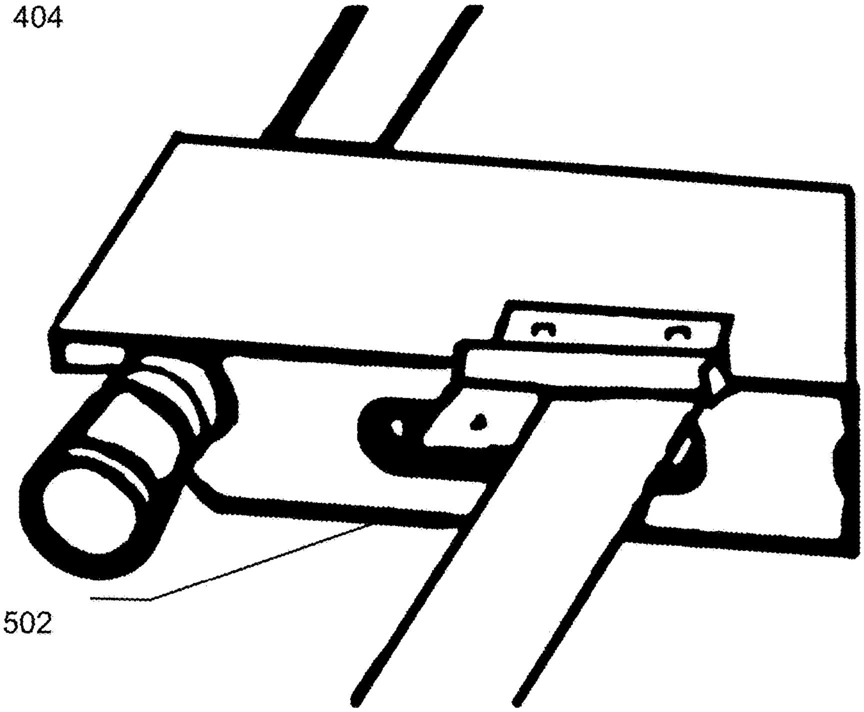
Figure 6:
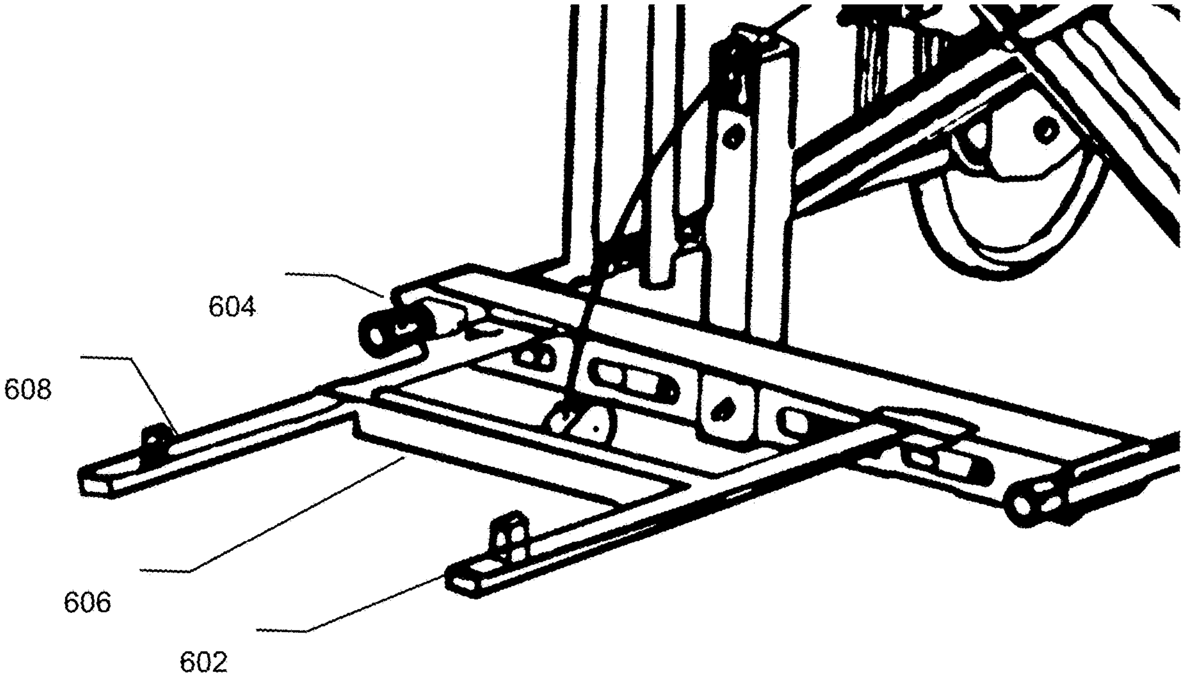
Figure 7:
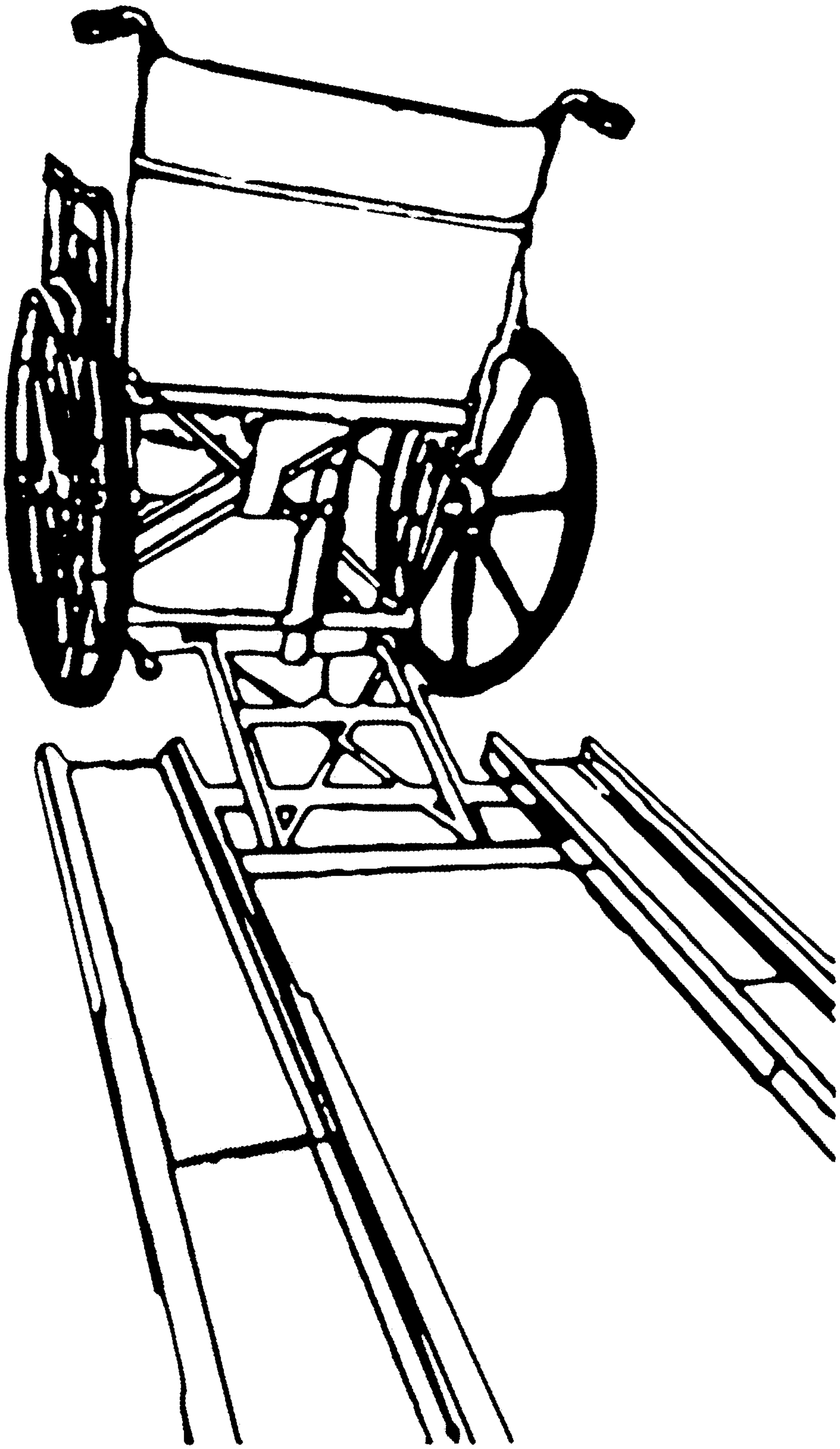

FIG. 4 shows a closeup of the model of the ramp, its sidewalls, and its traction-enhanced surface.

Electromechanical System

The Electromechanical System consists of a 24-V DC brushless motor 1808, microcontroller/motor shield controller 1804, battery 1806, along with wiring and user interface buttons/controls. The motor 1002—along with the motor controller, pulley, battery, and microcontroller—are mounted with shaft-collars 1200 along the front-bottom portion of the wheelchair in order to better distribute the total weight of the device. Steel cable 404 is wound around the motor-pulley 1004 and functions to transfer torque from the motor to the RAM during ramp deployment and retrieval.

A latching/mechanical locking/safety mechanism may be provided to maintain the RAM in the upright position (not shown). For example, a solenoid driven bayonet or ball-pin mechanism may be used to lock the RAM in the stowed position. This addition must be easy for the user to interface with and it must not interfere with functionality. A camera/rearview alignment system is preferably provided for the stakeholder to utilize the system (not shown).

A mechanical stop may be present behind the backseat to further protect the wheelchair occupant from collision with the ramp.

The ramp may be provided with a wedge at each end of the ramp 1606, to ease the bump where the ramp contacts the ground. Safety straps may be added to the wheelchair, that will keep the ramp in the upright position when not in use (not shown). This avoids, for example, a need to run the motor with a constant torque, and thus continually drain the battery.

The ramp contact with the ground is designed to have as high of a coefficient of friction as possible, to avoid slipping.

The wheelchair itself may be modified to provide a wheel ratcheting system to make rolling up and down the ramp safer and easier, and maximize the battery efficiency to increase the use cycles per charge.

Overall, the system and components above are more than sufficient in meeting the below criteria:

Load Capacity: at least 500-lbs.

Height Capability: 1-ft Elevations at a grade comfortable for wheelchair users.

Time Capability: 1 min 30 sec.

Portability: Fold-Compatible.

Ease of Use: Only Two Controls.

The invention thus boasts a niche in the market of devices for disabled users. The prototype device is suitable for adult individuals who utilize a standard-frame manual wheelchair and desire a light, affordable product to help traverse and uneven surfaces, and scale heights as great as 1-foot comfortably. The dimensions may be changed to accommodate other circumstances.

The system provides a practical, safe alternative for wheelchair users to avoid performing risky maneuvers to go up and down curbs.

Figure 8:
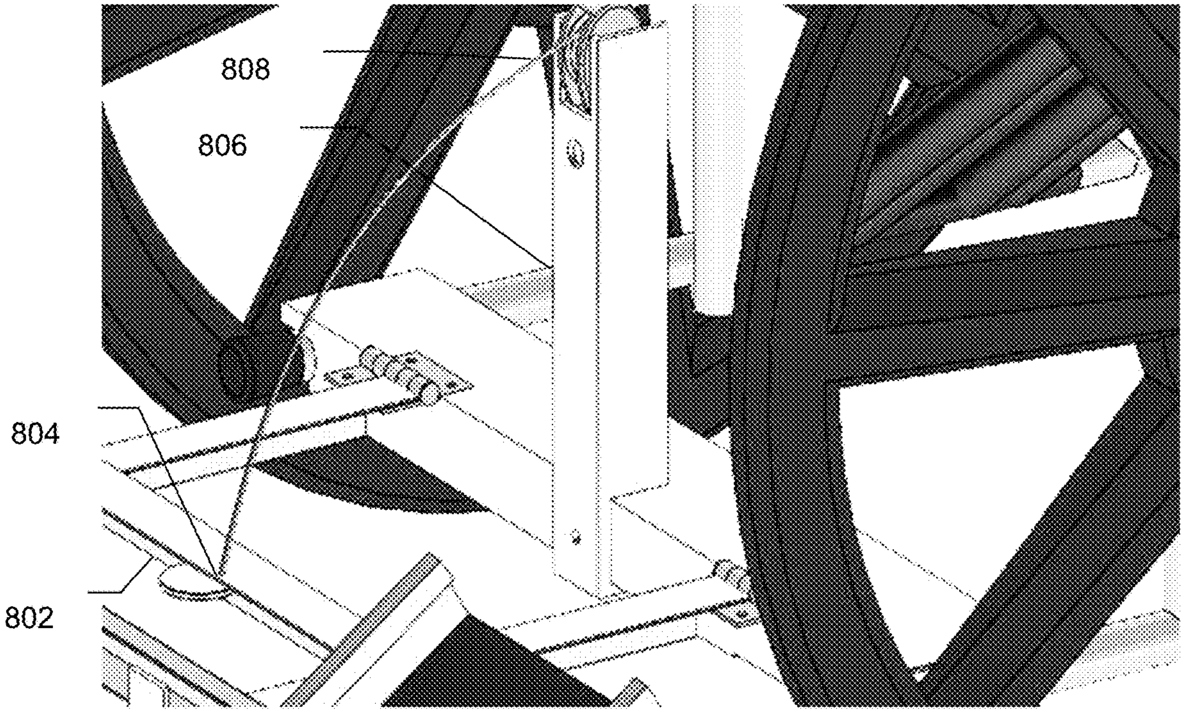
FIG. 8 shows a closeup of pulley-post with steel cable channeled through to pull RAM.

FIG. 8 shows a closeup of the pulley-post with steel cable channeled through to pull RAM.

Figure 9:
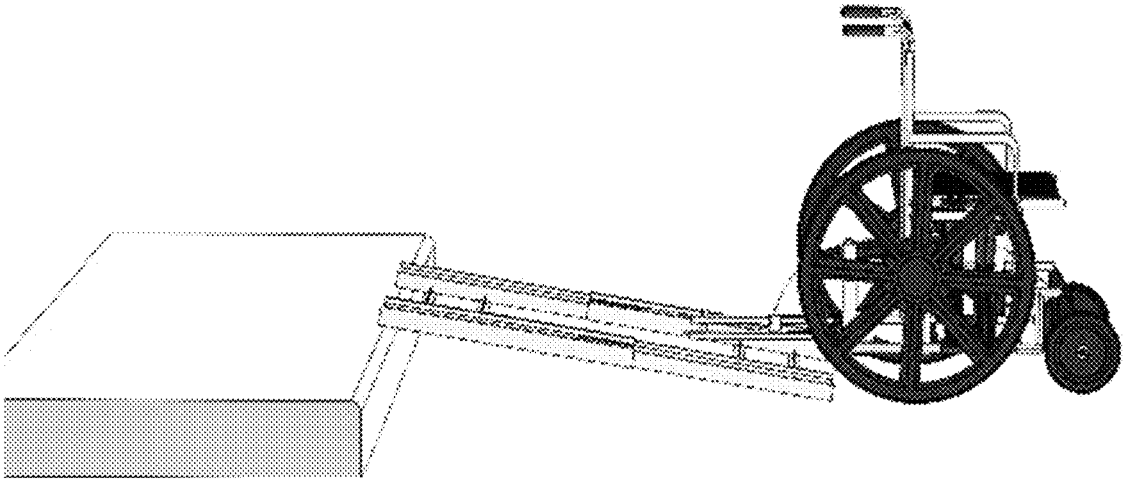
FIG. 9 shows a side view of ramp deployed and resting on top of a 7-inch curb.

FIG. 9 shows a side view of the ramp deployed and resting on top of 7-inch curb.

Figure 10A:
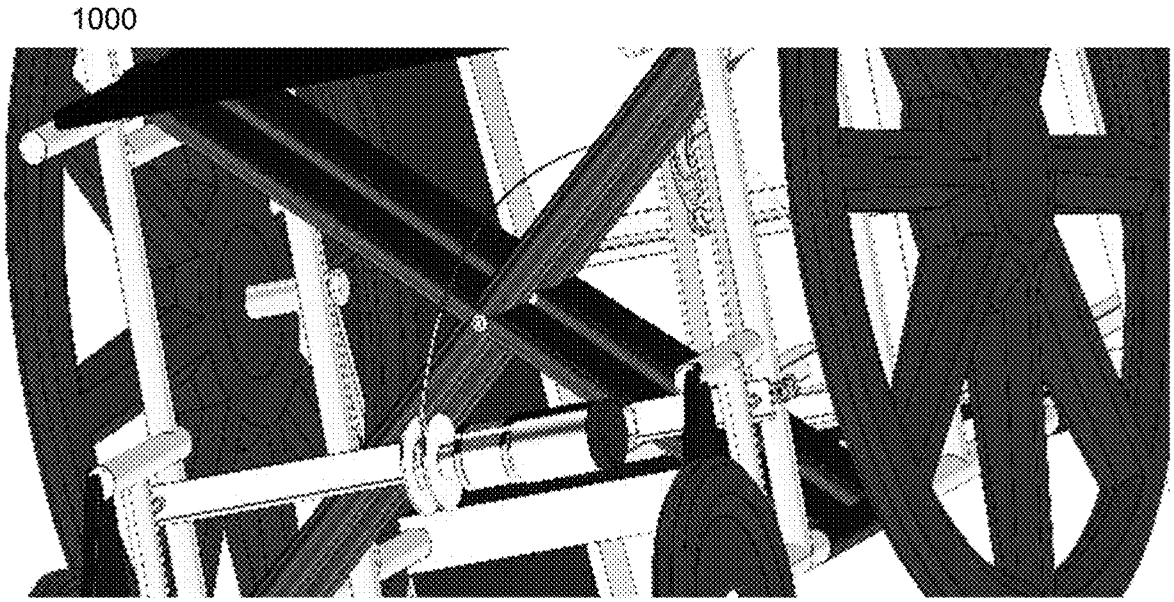
FIGS. 10A and 10B show closeup images of the motor, mount beam, and motor-pulley with steel cable wound in position.
Figure 10B:
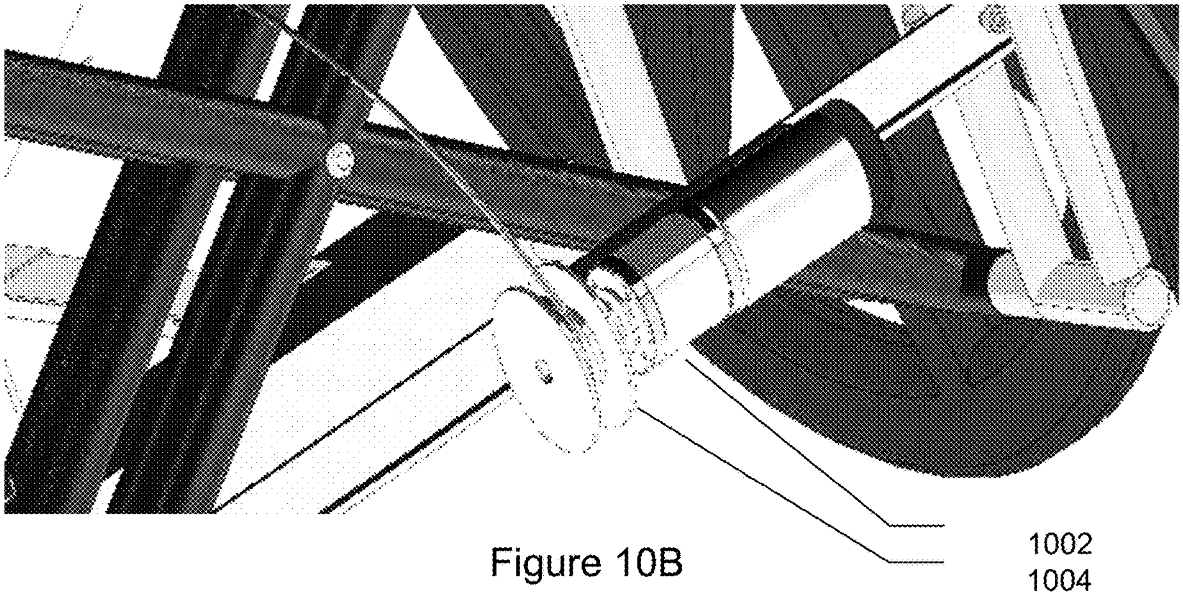

FIGS. 10A and 10B show closeup images of the motor, mount beam, and Motor-pulley with steel cable wound in position. The Microcontroller, motor shield, and battery are not shown.

Figure 11:
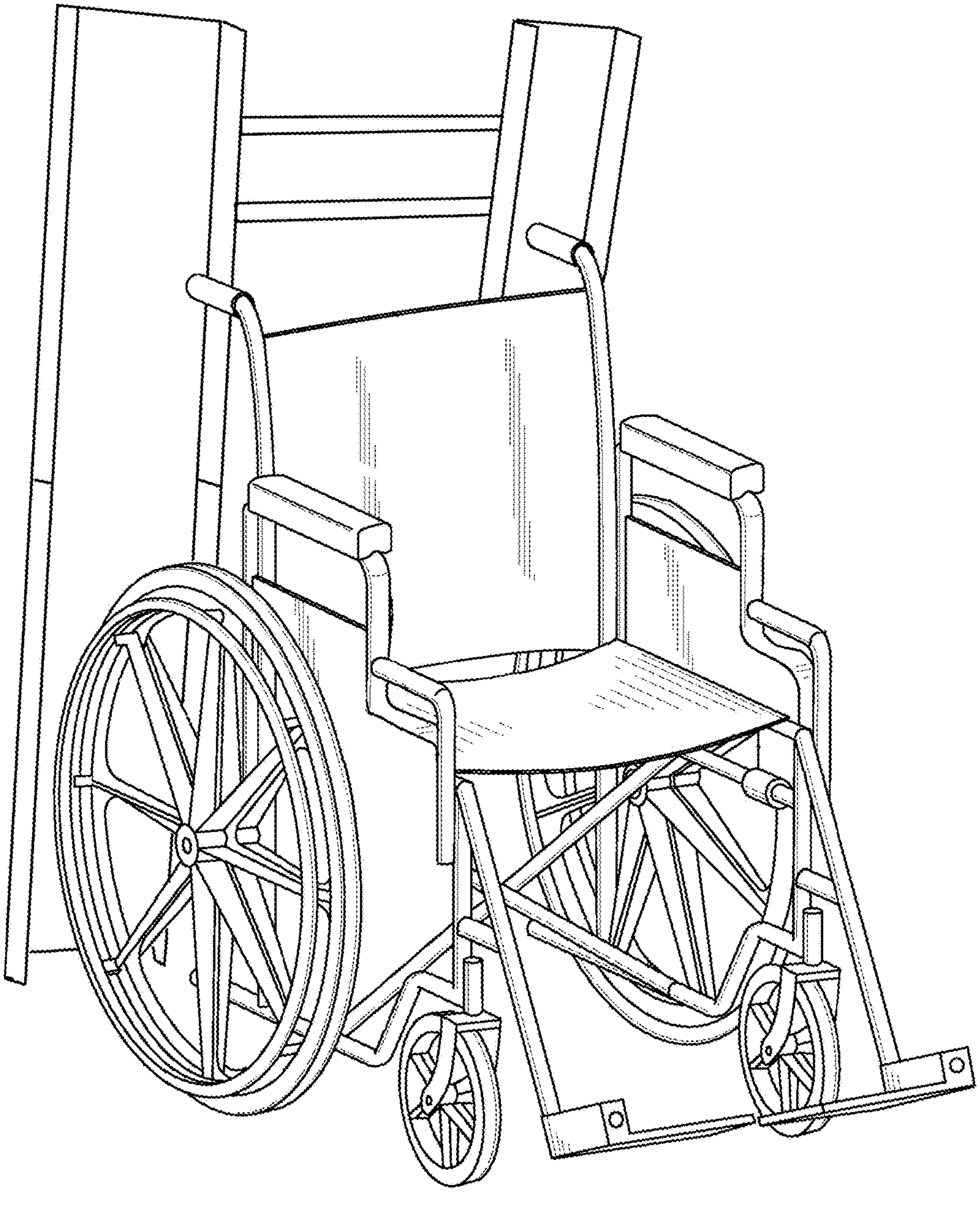
FIG. 11 shows a prototype device, with the ramp resting on rear of the wheelchair.

FIG. 11 shows a prototype device, ramp resting on rear of chair.

Figure 12:
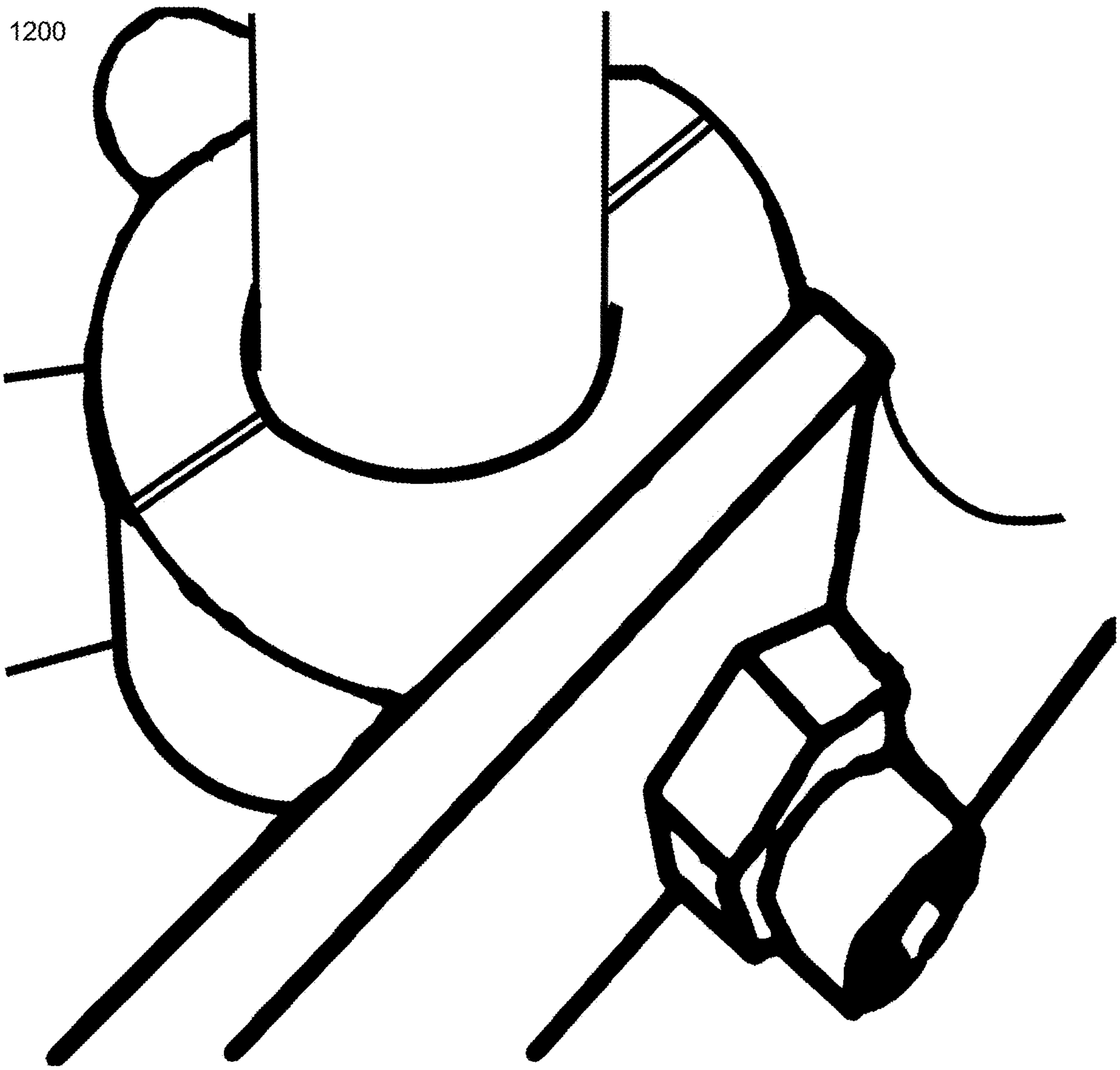
FIG. 12 shows a closeup image of a shaft-collar clamp.

FIG. 12 shows a closeup image of a shaft-collar clamp.

Figure 13:
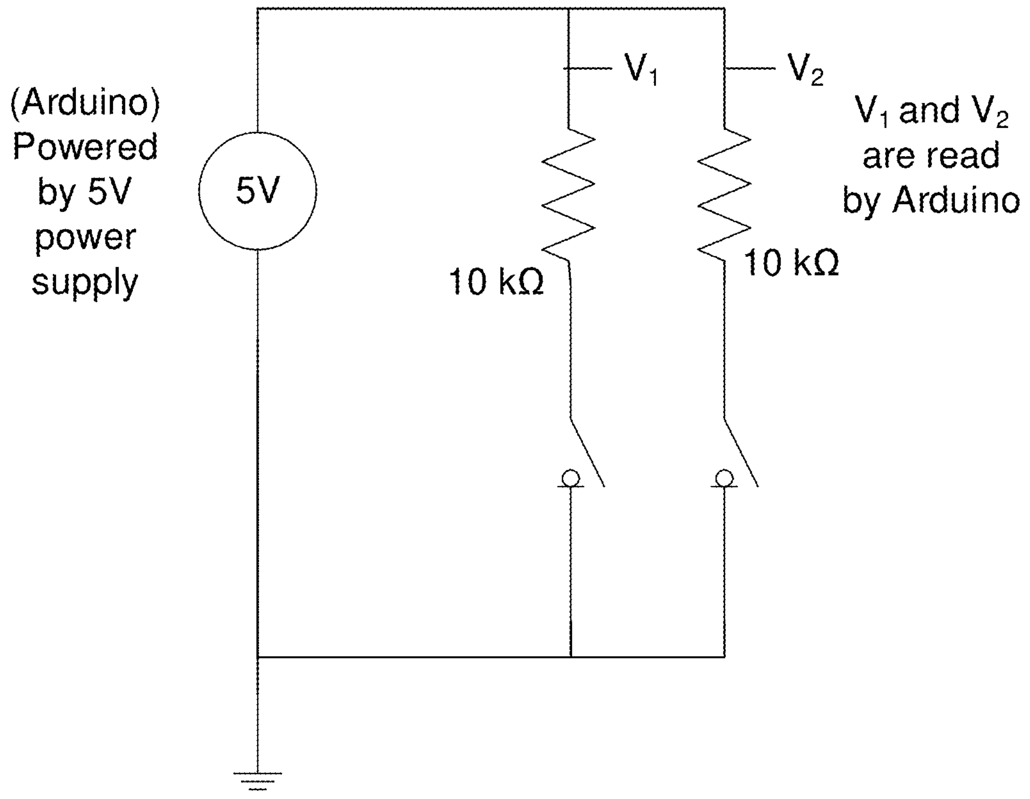
FIG. 13 shows a simplified circuit.

FIG. 13 shows a simplified circuit.

Figure 14:
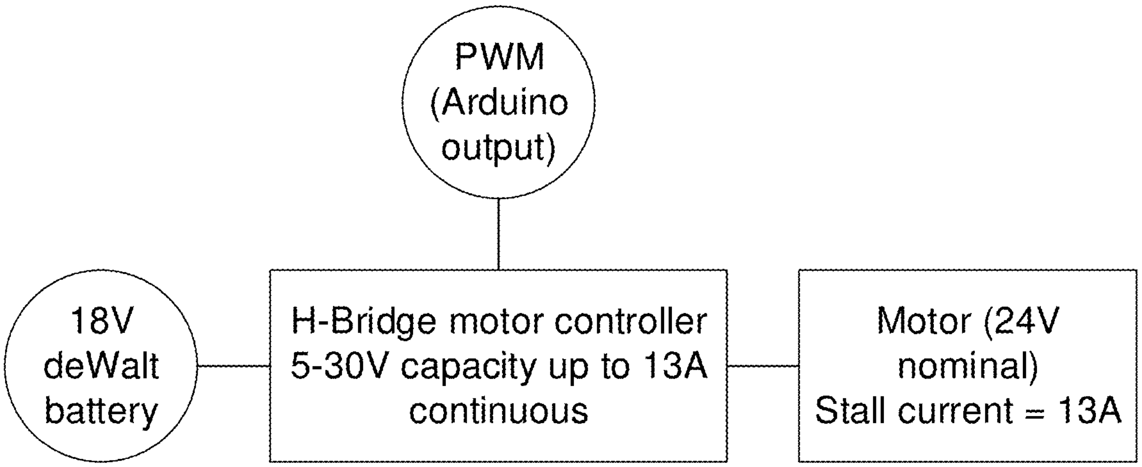
FIG. 14 shows a schematic drawings of the motor control circuit.

FIG. 14 shows a schematic disgram of the motor control circuit.

Figure 15A:
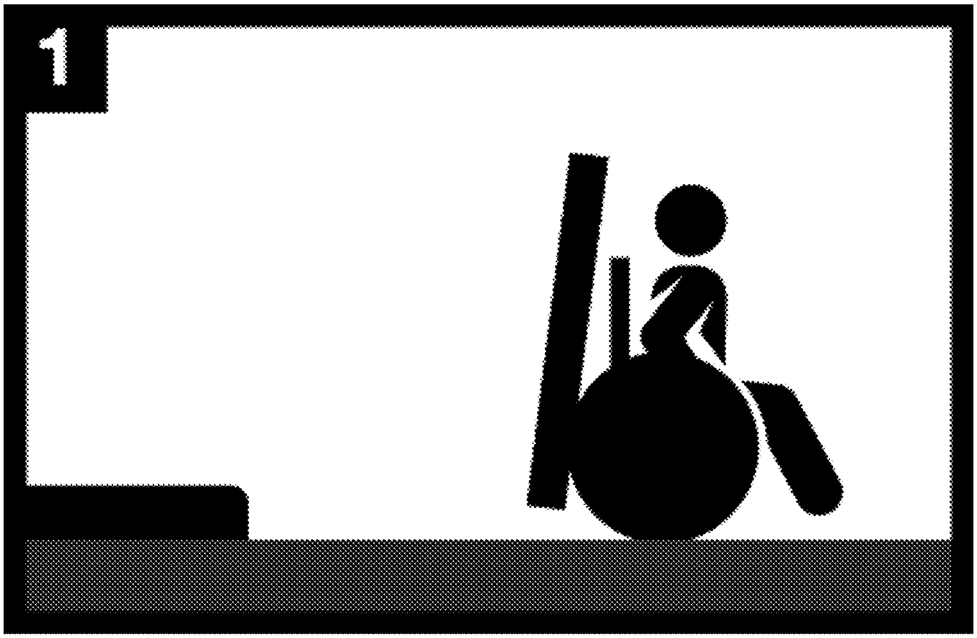
FIG. 15A-15H show schematic drawings representing stages of a method according to the present invention.
Figure 15B:
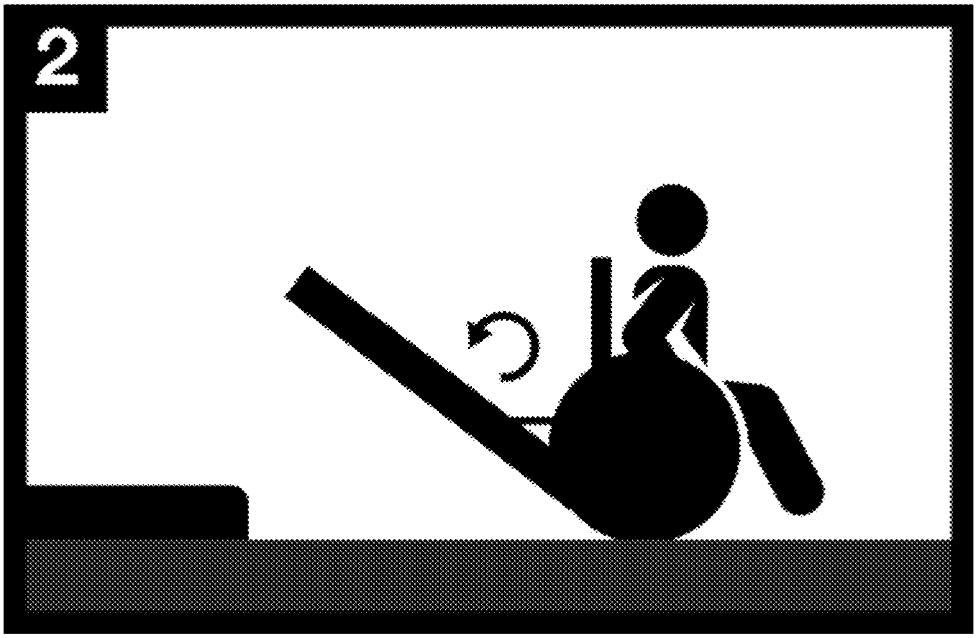
Figure 15C:
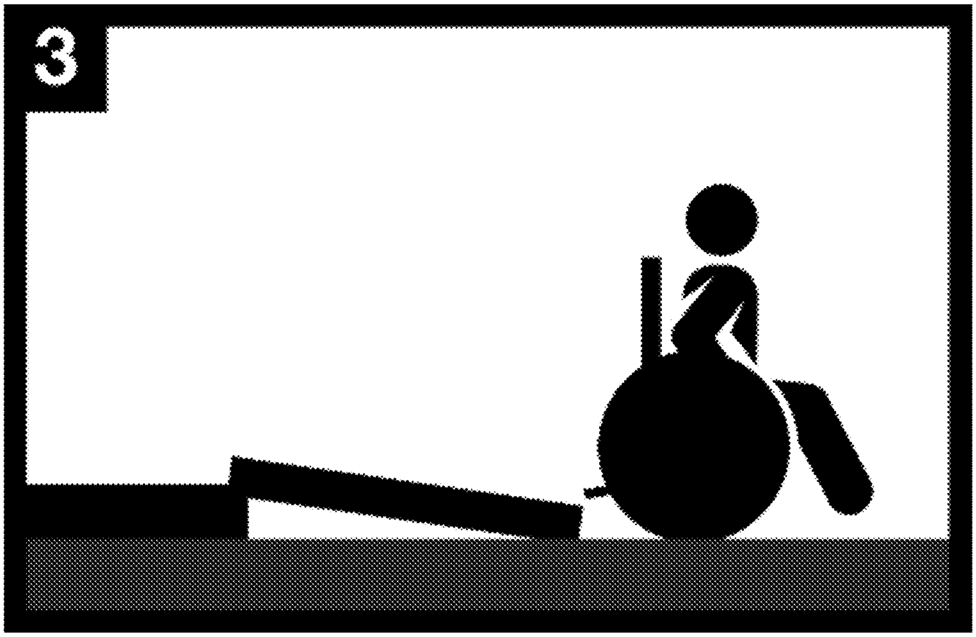
Figure 15D:
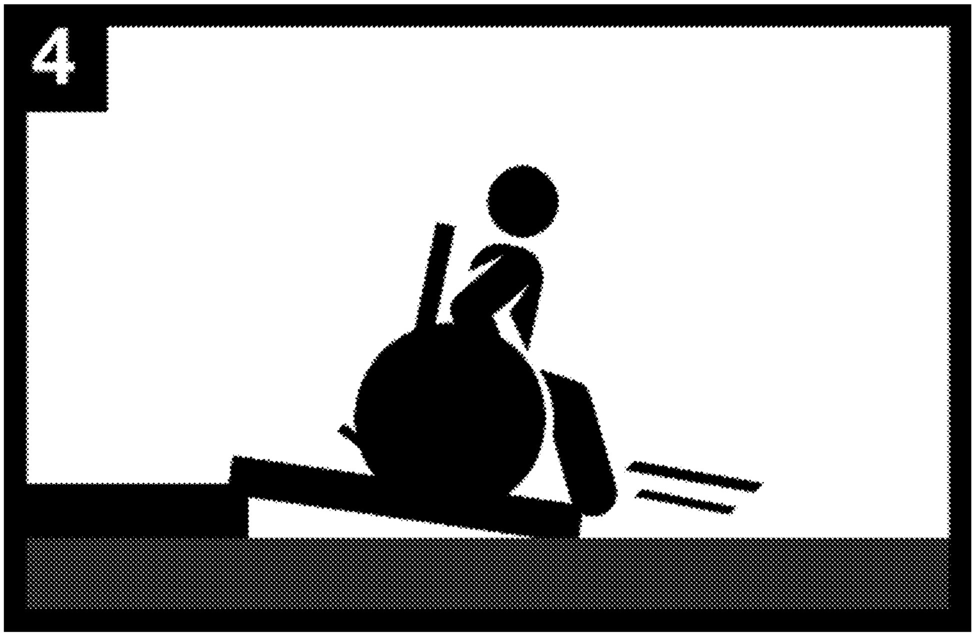
Figure 15E:
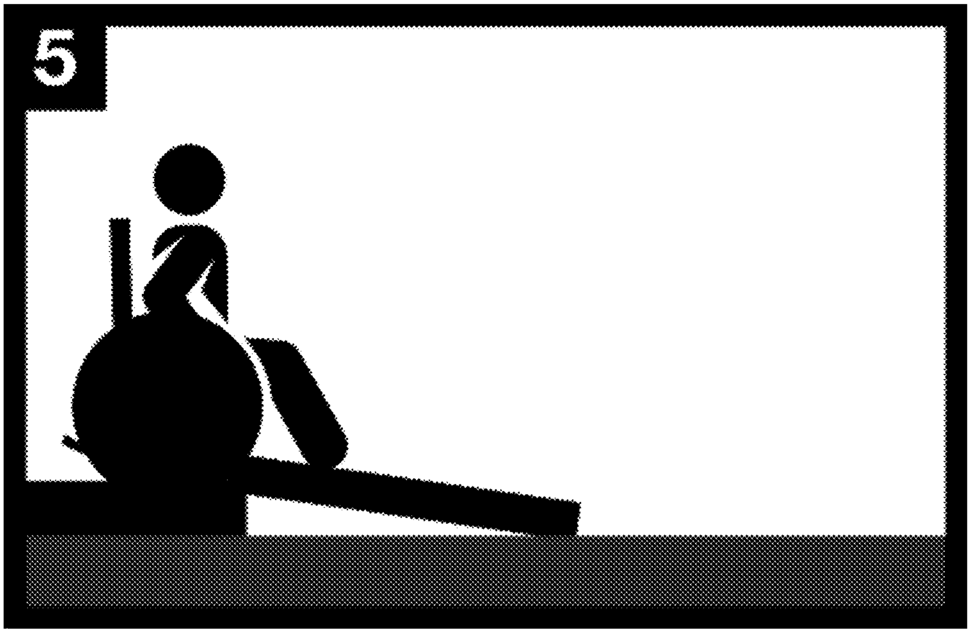
Figure 15F:
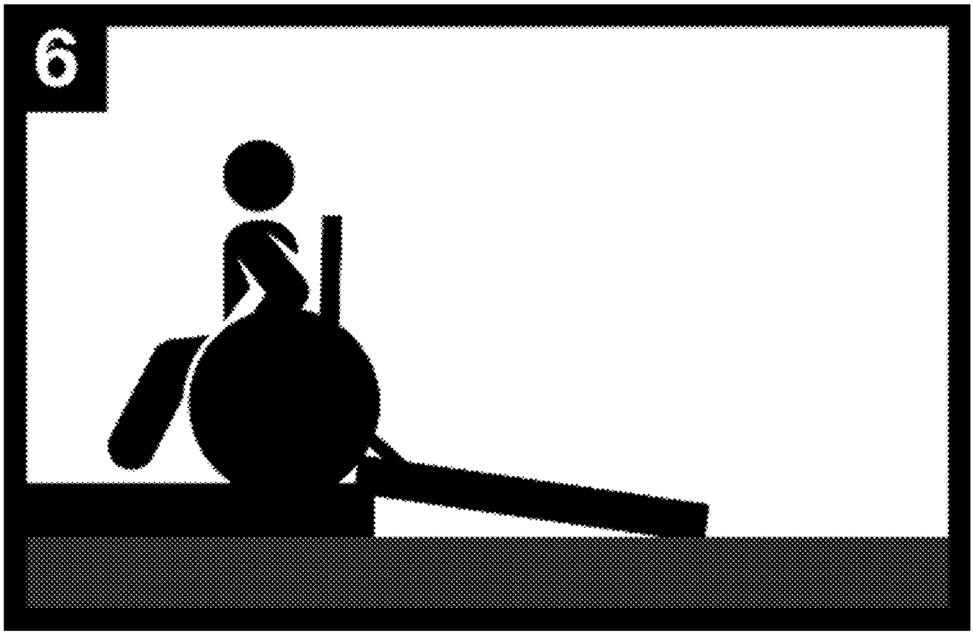
Figure 15G:
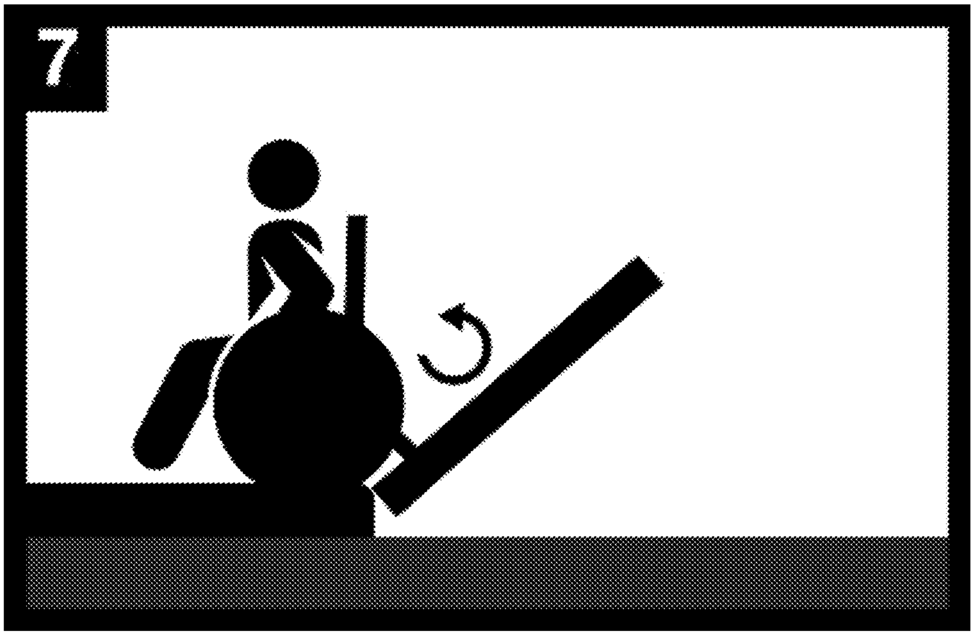
Figure 15H:

FIGS. 15A-15H represent stages of operation of the RAM. FIG. 15A represents the ramp held near vertically at the rear of a wheelchair, near a change in elevation (e.g., a curb). FIG. 15B represents the user controlling the RAM to lower the ramp to provide a smooth surface across the change in elevation. FIG. 15C represents the ramp in the fully lowered position, disengages from the RAM, and the user ready to back the chair across the ramp. FIG. 15D represents the user partially across the ramp. FIG. 15E represents the user fully across the ramp. FIG. 15F represents the user after turning the chair around, and in position to lift the ramp from its deployed position. FIG. 15G represents the user controlling the RAM to raise the ramp its stowed position. FIG. 15H represents the user ready to depart the change in elevation with the ramp in the near vertical position at the rear of the wheelchair.

Figure 16A:
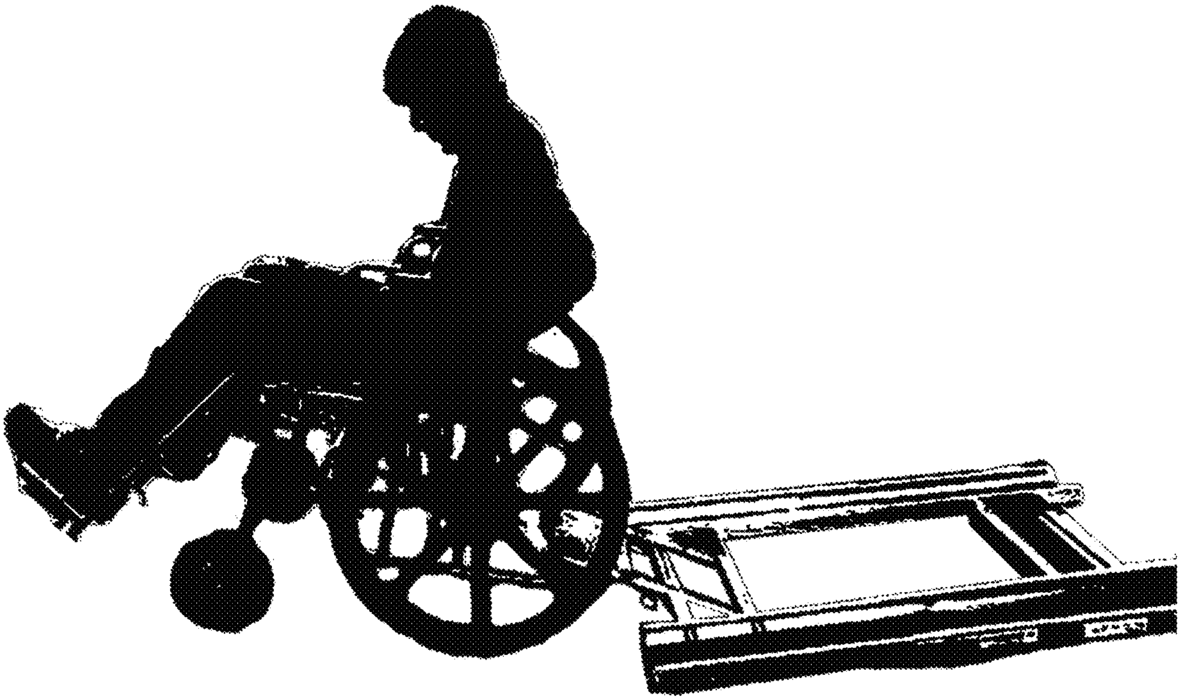
FIGS. 16A-16C show images of the ramp being raised by the RAM.
Figure 16B:
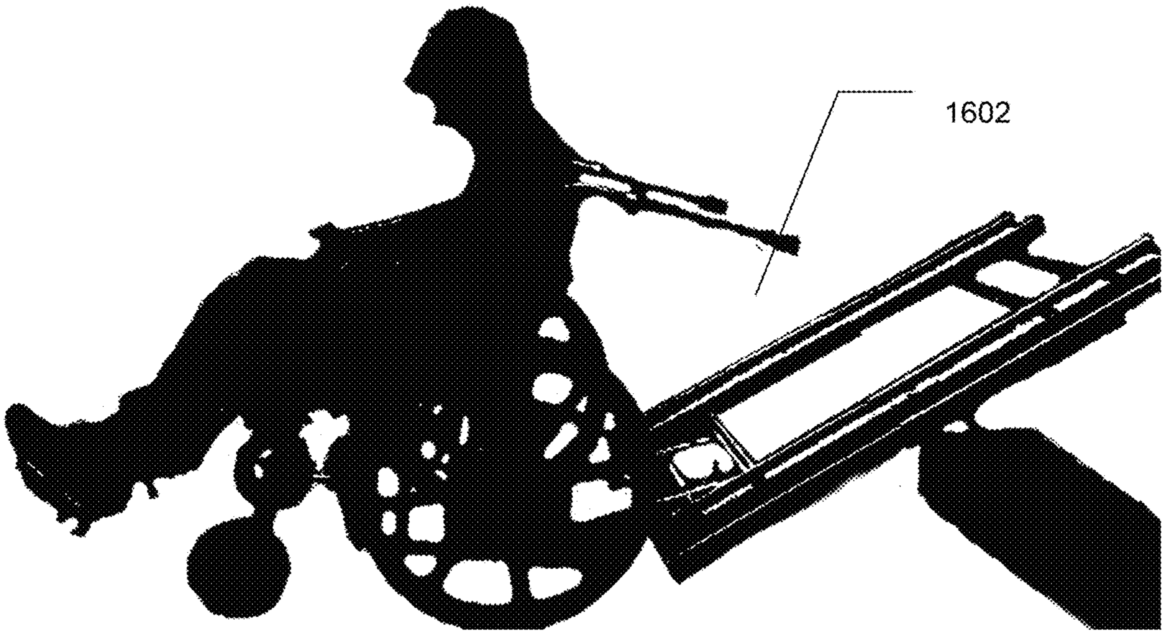
Figure 16C:

FIGS. 16A-16C show images of the ramp being raised by the RAM. FIG. 16A shows the user backing the wheelchair up to the ramp. FIG. 16B shows the RAM in mid position raising the ramp. FIG. 16C shows the ramp raised to the near-vertical position.

Figure 17:
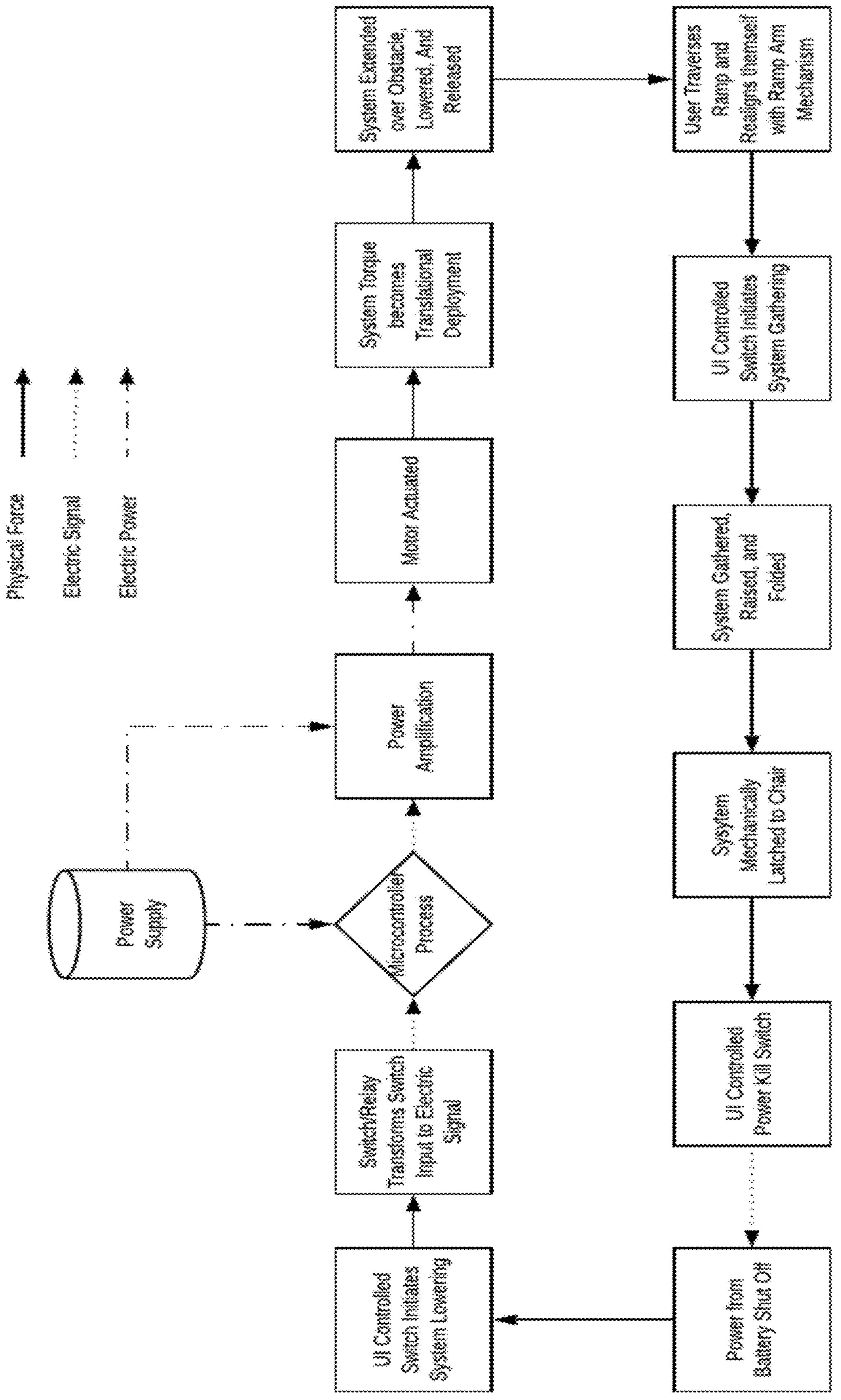
FIG. 17 shows a schematic drawing of the electronics.

FIG. 17 shows a schematic drawing of the electronics.

Figure 18:
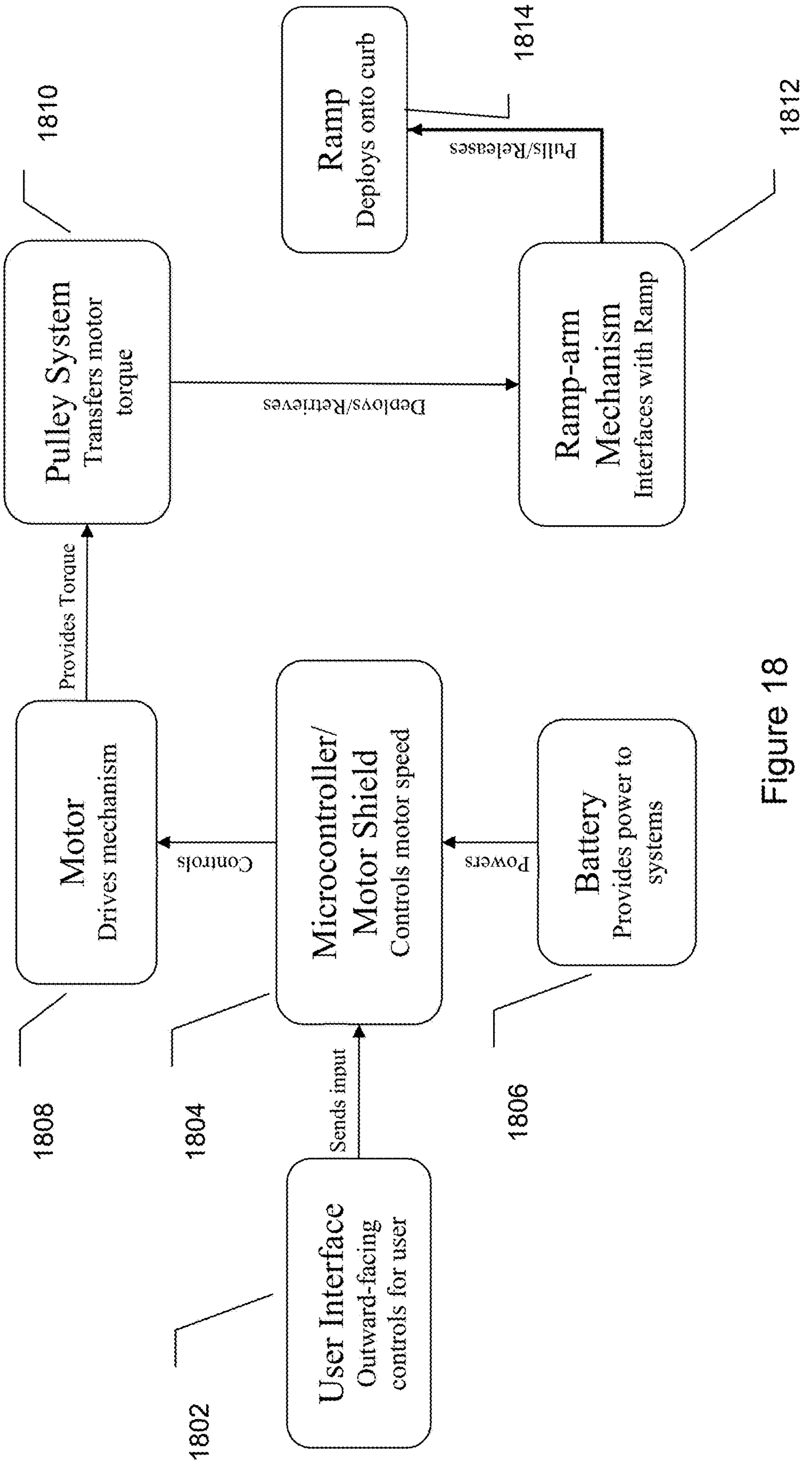
FIG. 18 shows a semi-schematic drawing of a system architecture.

FIG. 18 shows a semi-schematic drawing of a system architecture.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other features and acts that would be recognized by one skilled in the art are intended to be within the scope of the claims.

What is claimed is:

1. A wheelchair ramp system, comprising:

a hinge, configured for attachment to a wheelchair;

a lifting arm, configured for pivotal movement with respect to a wheelchair about the hinge, and having an interface configured to detachably couple to a ramp and to apply a cantilever force to the ramp for suspending the ramp;

the ramp, having two ends, comprising a platform configured to support wheels of a wheelchair when the ramp is supported at the two ends, and having an attachment structure configured to interface with the interface of the lifting arm; and a mechanism configured to supply a force for moving the lifting arm.

2. The wheelchair ramp system according to claim 1, wherein the interface of the lifting arm and the attachment structure of the ramp are configured to engage and disengage by linear movement of the wheelchair.

3. The wheelchair ramp system according to claim 1, wherein the mechanism comprises an electrical motor.

4. The wheelchair ramp system according to claim 1, wherein the mechanism comprises a geartrain.

5. The wheelchair ramp system according to claim 1, wherein the mechanism comprises a cable.

6. The wheelchair ramp system according to claim 1, wherein the lifting arm extends from a rear of the wheelchair and is attached to the wheelchair through the hinge.

7. The wheelchair ramp system according to claim 1, wherein the lifting arm is configured to supply the cantilever force to the ramp, to lift the ramp from a horizontal position to a vertical position behind a seat of the wheelchair with the end of the ramp above the ground.

8. The wheelchair ramp system according to claim 1, wherein the ramp is a telescoping ramp.

9. The wheelchair ramp system according to claim 1, further comprising a latch configured to secure the ramp in an upright position to the wheelchair.

10. The wheelchair ramp system according to claim 1, further comprising an electromechanical element configured to secure the ramp in an upright stowed position to the wheelchair, and to release the ramp from the upright stowed position.

11. The wheelchair ramp system according to claim 1, wherein a spring-loaded mechanical stop is provided to damp movement of the ramp stowed in an upright position to the wheelchair.

12. A system for deploying a wheelchair ramp configured to support a wheelchair over a traverse, having a pair of ramp rails connected with cross-members, comprising:

a hinge having a horizontal pivot axis, configured for attachment to a wheelchair;

a lifting arm, configured for pivotal attachment at a rear side of the wheelchair about the horizontal pivot axis, and having an interface configured to detachably couple to the wheelchair ramp between the ramp rails and at a respective cross member, and to apply a cantilever force to the ramp at the cross member for suspending the ramp; and a mechanism configured to supply a force for moving the lifting arm.

13. A method of operating a wheelchair ramp system, comprising:

supplying a force to deploy a wheelchair ramp, from a rear of a wheelchair, by lowering a pivotally-mounted lifting arm coupled to the wheelchair ramp;

advancing the wheelchair forward from the wheelchair ramp;

advancing the wheelchair rearward toward the wheelchair ramp;

coupling the pivotally-mounted lifting arm to the wheelchair ramp; and supplying a force to stow the wheelchair ramp, at the rear of the wheelchair, by raising the pivotally-mounted lifting arm coupled to the wheelchair ramp.

14. The method according to claim 13, wherein the wheelchair ramp system comprises:

the pivotally-mounted lifting arm, configured for pivotal movement with respect to the wheelchair, and having an interface for detachably coupling to the wheelchair ramp and to applying a cantilever force to the wheelchair ramp for suspending the wheelchair ramp; and the wheelchair ramp, having two ends, comprising a platform supporting wheels of the wheelchair when the wheelchair ramp is supported at the two ends, and having an attachment structure interfacing with the interface of the pivotally-mounted lifting arm.

15. The method according to claim 13, wherein the force is supplied by an electrical motor through a geartrain.

16. The method according to claim 15, wherein the geartrain drives a pulley with a cable.

17. The method according to claim 13, wherein the pivotally-mounted lifting arm extends from a rear of the wheelchair and is attached to the wheelchair through a hinge.

18. The method according to claim 13, wherein the ramp is a telescoping ramp, further comprising extending the telescoping ramp.

19. The method according to claim 13, further comprising latching the ramp in the raised position to the wheelchair.

20. The method according to claim 13, further activating an electromechanical element to release a latching of the ramp.

* * * * *